United States Patent
Orchard et al.

(10) Patent No.: US 7,589,825 B2
(45) Date of Patent: *Sep. 15, 2009

(54) RANGING APPARATUS

(75) Inventors: David Arthur Orchard, Malvern (GB); Andrew Charles Lewin, Malvern (GB); Simon Christopher Woods, Malvern (GB)

(73) Assignee: QinetiQ Limited, London (GB)

( * ) Notice: Subject to any disclaimer, the term of this patent is extended or adjusted under 35 U.S.C. 154(b) by 417 days.

This patent is subject to a terminal disclaimer.

(21) Appl. No.: 10/534,498

(22) PCT Filed: Nov. 11, 2003

(86) PCT No.: PCT/GB03/04898

§ 371 (c)(1), (2), (4) Date: May 10, 2005

(87) PCT Pub. No.: WO2004/044525

PCT Pub. Date: May 27, 2004

(65) Prior Publication Data

US 2006/0044546 A1    Mar. 2, 2006

(30) Foreign Application Priority Data

Nov. 11, 2002    (GB) .................................. 0226242.6

(51) Int. Cl.
G01C 3/08    (2006.01)
(52) U.S. Cl. ...................... 356/4.03; 356/4.01; 356/4.04
(58) Field of Classification Search ................. 356/4.04, 356/4.03, 4.01
See application file for complete search history.

(56) References Cited

U.S. PATENT DOCUMENTS

| 3,589,815 | A | * | 6/1971 | Hosterman | .................. 356/608 |
| 4,294,544 | A | | 10/1981 | Altschuler et al. | |
| 4,740,806 | A | * | 4/1988 | Takehana | ..................... 396/123 |
| 4,867,570 | A | * | 9/1989 | Sorimachi et al. | ........... 356/603 |

(Continued)

FOREIGN PATENT DOCUMENTS

DE    43 04 815 A    8/1994

(Continued)

OTHER PUBLICATIONS

P. M. Gourlay et al., "Coherent Kaleidoscope. II. Experimental Observations of Sibling-Spot Formation in Hollow and Solid, Square and Rectangular Waveguides", Applied Optics, Optical Society of America, vol. 33, No. 3, Jan. 20, 1994, pp. 384-396, XP000425016.

(Continued)

Primary Examiner—Thomas H Tarcza
Assistant Examiner—Timothy A Brainard
(74) Attorney, Agent, or Firm—Nixon & Vanderhye P.C.

(57) ABSTRACT

This invention relates to a ranging apparatus capable of ranging simultaneously to a three dimensional scene. An illumination means (22) illuminates a scene with a two dimensional array of spots (12). A detector (6) is located near to the illumination means (22) and arranged to look toward the scene. A processor (7) responds to the output from the detector (6) and, from the location of a spot in the image of the scene, determines the range to that spot. A variety of techniques are used to resolve ambiguity in determining which projected spot is being considered.

52 Claims, 6 Drawing Sheets

U.S. PATENT DOCUMENTS

| | | | |
|---|---|---|---|
| 5,003,166 A | | 3/1991 | Girod |
| 5,012,453 A * | | 4/1991 | Katz .......................... 367/57 |
| 5,175,601 A | | 12/1992 | Fitts |
| 5,519,204 A * | | 5/1996 | Rudd et al. ................ 250/205 |
| 5,585,626 A | | 12/1996 | Beck et al. |
| 5,625,738 A * | | 4/1997 | Magarill ..................... 385/146 |
| 5,675,407 A | | 10/1997 | Geng |
| 5,726,443 A | | 3/1998 | Chapman et al. |
| 5,748,295 A * | | 5/1998 | Farmer ....................... 356/5.09 |
| 5,793,035 A | | 8/1998 | Beck et al. |
| 5,825,476 A | | 10/1998 | Abitol et al. |
| 5,852,672 A | | 12/1998 | Lu |
| 5,910,767 A * | | 6/1999 | Frucht ........................ 340/557 |
| 6,147,760 A | | 11/2000 | Geng |
| 6,154,279 A | | 11/2000 | Thayer |
| 6,160,479 A | | 12/2000 | Aahlen et al. |
| 6,318,863 B1 | | 11/2001 | Tiao et al. |
| 6,377,353 B1 | | 4/2002 | Ellis |
| 6,392,744 B1 * | | 5/2002 | Holec ......................... 356/4.03 |
| 6,480,265 B2 * | | 11/2002 | Maimon et al. ............ 356/4.07 |
| 6,512,575 B1 * | | 1/2003 | Marchi ....................... 356/5.1 |
| 6,538,751 B2 * | | 3/2003 | Ono ............................ 356/614 |
| 6,545,749 B1 * | | 4/2003 | Andersson ................. 356/5.01 |
| 6,572,139 B2 | | 6/2003 | Adachi |
| 6,580,814 B1 * | | 6/2003 | Ittycheriah et al. ......... 382/115 |
| 6,618,123 B2 * | | 9/2003 | Uomori et al. ............. 356/3.12 |
| 6,700,651 B2 * | | 3/2004 | Taka .......................... 356/3.14 |
| 6,717,654 B1 * | | 4/2004 | Rajchel et al. ............. 356/4.01 |
| 6,721,465 B1 * | | 4/2004 | Nakashima et al. ......... 382/318 |
| 6,801,639 B2 * | | 10/2004 | Nonaka et al. .............. 382/106 |
| 2001/0035636 A1 | | 11/2001 | Adachi |
| 2002/0008055 A1 | | 1/2002 | Campbell et al. |
| 2002/0016631 A1 | | 2/2002 | Marchitto et al. |
| 2003/0012115 A1* | | 1/2003 | Akiyama et al. ....... 369/112.02 |
| 2003/0128361 A1* | | 7/2003 | Kuroda et al. ............... 356/400 |

FOREIGN PATENT DOCUMENTS

| | | |
|---|---|---|
| DE | 101 49 750 A | 9/2002 |
| EP | 0 994 342 | 4/2000 |
| EP | 1 134 595 A | 9/2001 |
| FR | 2585853 | 2/1987 |
| GB | 2 372 656 | 8/2002 |
| JP | 62-007019 | 1/1987 |
| JP | 62291512 | 12/1987 |
| JP | 63263412 | 10/1988 |
| JP | 10 031073 A | 2/1998 |
| JP | 10062161 | 3/1998 |
| WO | WO 88/09947 | 12/1988 |
| WO | 02/40940 A | 5/2002 |

OTHER PUBLICATIONS

Lewin et al, U.S. Appl. No. 10/534,494, filed May 10, 2005.
Lewin et al, U.S. Appl. No. 10/534,495, filed May 10, 2005.
H. Mass, "Robust Automatic Surface Reconstruction with Structured Light" International Archives of Photogrammetry and Remote Sensing, vol. XXIX, 1982, pp. 1-9.

* cited by examiner

| × | 1 point per image |
| ● | 4 points per image |
| □ | 9 points per image |

RANGING APPARATUS

This application is the US national phase of international application PCT/GB2003/004898 filed 11 Nov. 2003, which designated the U.S. and claims priority of GB 0226242.6, filed 11 Nov. 2002, the entire contents of each of which are hereby incorporated by reference.

This invention relates to a range finding apparatus, especially to an imaging range finding apparatus.

Imaging range finding systems often illuminate a scene and image the light reflected from the scene to determine range information.

One known system, a so called triangulation system, uses a source arranged to illuminate a scene with a beam of light such that a spot appears in the scene. A detector is oriented in a predetermined fashion with respect to the source such that the position of the spot of light in the scene reveals range information. The beam of light may be scanned in both azimuth and elevation across the scene to generate range information from across the whole scene. In some systems the beam of light may be a linear beam such that one dimensional range information is gathered simultaneously and the linear beam scanned in a perpendicular direction to gain range information in the other dimension.

Systems such as this require scanning which adds to the cost and complexity and also means that accurate ranging is not possible with fast changing scenes. Further the illumination in known triangulation systems often requires laser systems. Use of laser systems may have safety implications and can require complicated and relatively expensive scanning mechanisms. Lasers are also relatively high power sources.

U.S. Pat. No. 6,154,279 discloses a method and apparatus for determining the shapes of countersunk holes. At least one laser directs laser light towards the surface having the hole so as to create a light spot and the lateral displacement of the spot as compared to a reference image f a flat surface is used to give depth information. In one embodiment the laser(s) may project a plurality of spots so that analysis of many spots can be performed in one image. However the method as described in U.S. Pat. No. 6,154,279 is only appropriate for looking at continuous surfaces in a known limited depth of field and requires a model of the observed surface to work correctly. It is not therefore applicable to providing range information from a scene consisting of discrete objects over a large depth of field.

U.S. Pat. No. 4,294,544 describes a system for obtaining three dimensional topographic data from a scene. The scene is illuminated with a plurality of laser beams which are switched on and off in a predetermined sequence so that each spot detected in the scene can be identified with one of the projected beams. An imager is arranged to view the scene illuminated with each of the different pattern of spots and, once a spot has been identified, determine the range to that spot. The method involves several projection stages however and uses lasers and relatively complex shutter arrangements to project the different patterns. The projection stages also take time, so similar to scanned systems, the apparatus described is not suitable for use for relatively fast changing scenes.

U.S. Pat. No. 4,867,570 discloses a method and apparatus for obtaining three dimensional information about an object by projecting a plurality of pattern beams onto the object. A light source is arranged behind a mask having a plurality of windows. A lens projects an image of the light source as seen through the mask onto the object to be imaged and another lens of the same power and arranged in the same plane with a parallel optical axis to the first lens images the scene onto a CCD array. The position of the spots in the scene gives the range to that spot although the method by which the range is calculated is not clear. The depth of field of the projection system is somewhat limited however because of the use of a lens imaging the illuminated mask and also the projection means will not have a wide angle of projection. Therefore again the invention described will only be applicable to imaging restricted fields of view in a narrow operating range.

An alternative ranging system is described in U.S. Pat. No. 6,377,353. Here a light source is arranged in front of a patterned slide which has an array of apertures therein. Light from the source only passes through the apertures so as to project an array of spots onto the scene. The range information in this apparatus is determined by analysing the size and shape of the spots formed. This system requires the size of the spots and orientation thereof to be determinable however which requires reasonable differences in spot size. The system necessarily therefore has a limited depth of view and is only really usable for ranging to continuous surfaces.

It is therefore an object of the present invention to provide a ranging apparatus that mitigates at least some of the above mentioned disadvantages and is useable over a large depth of field and for scenes having discrete objects located therein.

Therefore according to the present invention there is provided a ranging apparatus comprising an illumination means for illuminating a scene with a two dimensional array of light spots, a detector for detecting the location of spots in the scene and a processor adapted to determine, from the detected location of a spot in the scene, the range to that spot.

The illumination means illuminates the scene with an array of spots. The detector then looks at the scene and the processor determines the location of spots in the detected scene. The apparent location of any spot in the array will change with range due to parallax. As the relationship of the detector to the illumination means is known, the location in the scene of any known spot in the array can yield the range to that point.

Of course, to be able to work out the range to a spot, it is necessary to know which spot in the array is being considered. In the prior art single spot systems, there is only one spot in the scene and so there is no difficulty. Even when using a linear beam the beam is projected so as to be parallel to one direction, say the y-direction. For each value in the y-direction then the actual x-position in the scene can then be used to determine the range.

Were a two dimensional array of spots to be used however the spots would be distributed in both the x and y directions. The skilled person would therefore not be inclined to use a two dimensional array of spots as they would have thought that this would have meant that the ranging system would either be unable to determine which spot was which and hence could not perform ranging or would produce a result that could suffer from errors if the wrong spot had been considered. The present invention however does allow use of a two dimensional array of spots for simultaneous ranging of a two-dimensional scene and uses various techniques to avoid ambiguity over spot determination.

U.S. Pat. No. 4,294,544 does teach use of an array of spots but teaches that the spots are switched on and off in a predetermined fashion so that each spot can be uniquely identified by determining which frames it appears in. This requires a relatively complex illumination system however and also requires several frames of the scene to be taken adding to the time taken to gain range information. Where the projected array consists of N columns of spots the method of U.S. Pat. No. 4,294,544 requires the number of images I to be acquired to be $I=1+\log_2 N$.

U.S. Pat. No. 6,154,279 also teaches projection of an array of spots for ranging purposes but only in very controlled circumstances, over a very restricted depth of field where ambiguity is unlikely to be a problem and only for known continuous surfaces which can be modelled by the ranging apparatus. U.S. Pat. No. 4,867,570 further teaches projection of an array of spots for range determination but gives no indication of how that range information is determined nor how ambiguities in the scene may be resolved.

As used herein the term array of spots is taken to mean any array which is projected onto the scene and which has distinct areas of intensity. Generally a spot is any distinct area of high intensity radiation and may, as will be described later, be adapted to have a particular shape. The areas of high intensity could be linked however provided that the distinct spot can be identified. For instance the illumination means may be adapted to project an array of intersecting lines onto the scene. The intersection of the lines is a distinct point which can be identified and is taken to be a spot for the purposes of this specification.

Conveniently the illumination means and detector are arranged such that each spot in the projected array appears to move in the detected scene, from one range to another, along an axis and the axis of apparent motion of each adjacent spot in the projected array is different. As will be explained later each spot in the array will appear at a different point in scene depending upon the range to the target. If one were to imagine a flat target slowly moving away from the detector each spot would appear to move across the scene. This movement would, in a well adjusted system used in certain applications, be in a direction parallel to the axis joining the detector and illumination means, assuming no mirrors etc. were placed in the optical path of the detector or illumination means. Each spot would however keep the same location in the scene in the direction perpendicular to this axis. For a different arrangement of illumination means and detector the movement would appear to be along generally converging lines.

Each projected spot could therefore be said to have a locus corresponding to possible positions in the scene at different ranges within the operating range of the system, i.e. the locus of apparent movement would be that part of the axis of apparent motion at which a spot could appear, as defined by the set-up of the apparatus. The actual position of the spot in the detected scene yields the range information. Where the apparent direction of movement of a spot at various ranges happens to be the same as for another spot then the loci corresponding to the different spots in the projected array may overlap. In which case the processor would not be able to determine which spot in the projected array is being considered. Were the loci of spots which are adjacent in the projected array to overlap, measurement of the location in the scene of a particular spot could correspond to any of a number of different ranges with only small distances between the possible ranges. For example, imagine the array of spots was a two dimensional array of spots in an x-y square grid formation and the detector and illumination means were spaced apart along the x-axis only. Using Cartesian co-ordinates to identify the spots in the projected array with (0,0) being the centre spot and (1,0) being one spot along the x-axis, the location in the scene of the spot at position (0,0) in the projected array at one range might be the same as the position of projected spot (1,0) at another slightly different range or projected even spot (2,0) at a slightly different range again. The ambiguity in the scene would therefore make range determination difficult.

Were however the detector and illumination means arranged such that the axis between them was not parallel to either the x-axis or the y-axis of the projected array then adjacent spots would not overlap. Ideally the locus of each spot in the projected array would not overlap with the locus of any other spot but in practice with relatively large spots and large arrays this may not be possible. However if the arrangement was such so that the loci of each spot only overlapped with that of a spot relatively far removed in the array then although ambiguity would still be present the amount of ambiguity would be reduced. Further the difference in range between the possible solutions would be quite large. For example the range determined were a particular projected spot, (0,4) say, to be detected at one position in the scene could be significantly different from that determined if a spot removed in the array (5,0) appeared at the same position in the scene. In some applications the operating range may be such that the loci corresponding to the various possible locations in the scene of the spots within the operating window would not overlap and there would be no ambiguity. Even where the range of operation would allow the loci of spots to overlap the significant difference in range could allow a coarse estimation of range to be performed to allow unique determination of which spot was which with the location of each spot in the scene then being used to give fine range information.

One convenient way of determining coarse range information involves the illumination means and detector being adapted such that a projected array of spots would appear sharply focussed at a first distance and unfocussed at a second distance, the first and second distances being within the operating range of the apparatus. The processor is adapted to determine whether a spot is focussed or not so as to determine coarse range information. For example if a detected spot could correspond to projected spot (0,4) hitting a target at close range or projected spot (5,0) hitting a target at long range the processor could look at the image of the spot to determine whether the spot is focussed or not. If the illumination means and detector were together adapted such that the spots were focussed at long range the determination that the spot in question was focussed would mean that the detected spot would have to be projected spot (5,0) hitting a target at long range. Had an unfocussed spot been detected this would have corresponded to spot (0,4) reflected from a target at close range. Preferably in order to ease identification of whether a spot is focussed or not the illumination means is adapted to project an array of spots which are non-circular in shape when focussed, for instance square. An in focus spot would then be square whereas an unfocussed spot would be circular. Of course other coarse ranging methods could be used—the size of a spot could be used as an indication of coarse range.

The present invention therefore allows the determination of range in a scene using a single captured frame of a scene. This avoids the need for complicated coding systems such as described in U.S. Pat. No. 4,294,544 allowing for very fast ranging. Further the processor uses the position of a spot in the scene to determine the possible range and where there is a possible ambiguity in range can look at secondary characteristics such as the shape of the spot to resolve any ambiguity. The processor may thus be adapted to resolve any residual ambiguity present in the scene. Of course the position of other spots in the scene may also be taken into account in assessing whether there is any ambiguity. In the example above, if an observed spot could correspond to projected spot (5,0) or (0,4) but another spot observed in the scene could only be due to projected spot (5,0) or no other spot in the scene could correspond to projected spot (0,4) then the ambiguity is resolved (although this assumes that the detector can see all spots projected to the scene).

The present invention therefore provides a ranging system having a large depth of field and having means for resolving any ambiguity in identification of observed spots. The invention may be used on scenes having lots of discrete items at various ranges and provides fast ranging so can be used on evolving scenes. For some applications the ranging apparatus may be able to resolve range to objects in a scene within an operating window of 150 millimetres to 2.5 metres giving a large field of view. Other applications may be used with even larger operating windows or a greater maximum range or shorter minimum range. The preferred illumination means of the present invention as will be described later can usefully produce a depth of field from 150 mm to infinity.

As an additional or alternative method of resolving possible ambiguity the illumination means could be adapted to periodically alter the two dimensional array of projected spots, i.e. certain spots could be turned on or off at different times. The apparatus could be adapted to illuminate the scene cyclically with different arrays of spots. In effect one frame could be divided into a series of sub-frames with a sub-array being projected in each sub-frame. Each sub-array would be adapted so as to present little or no range ambiguity in that sub-frame. Over the whole frame the whole scene could be imaged in detail but without ambiguity. This approach has the disadvantage though that imaging may take several sub-frames. However unlike the approach adopted in U.S. Pat. No. 4,294,544 where illumination with various sub-frames is needed to perform spot identification the present invention performs ranging on the data acquired each sub-frame. The use of more than one sub-frame increases, over time, the number of range points in the image so increases the image resolution with respect to range. The present invention may therefore operate with fewer sub-frames than the prior art and can still be used to give good resolution to relatively fast changing scenes.

An alternative approach could be to illuminate the scene with the whole array of spots and identify any areas of ambiguity. If a particular detected spot could correspond to more than one projected spot at different ranges, one or more of the possible projected spots could then be deactivated so as to resolve the ambiguity. This approach may require more processing but could allow quicker ranging and would require a minimum of additional sub-frames to be acquired to perform ranging, i.e. less than the $I=1+\log_2 N$ sub-frames described in U.S. Pat. No. 4,294,544. Depending on the illumination means and the ease of switching individual spots off it may generally be sufficient to take one additional sub-frame with a sub-set of spots illuminated to provide complete ranging information.

Additionally or alternatively the illumination means may be adapted so as to produce an array of spots wherein at least some projected spots have a different characteristic to their adjacent spots. The different characteristic could be colour or shape or both. Having a different colour or shape of spot again reduces ambiguity in detected spots. Although the loci of different spots may overlap, and there may be some ambiguity purely based on spot location in the scene, if the projected spots giving rise to those loci are different in colour and/or shape the processor would be able to determine which spot was which and there would be no ambiguity. The detector and illumination means are therefore preferably arranged such that if the locus of one projected spot does overlap with the locus of one or more other projected spots at least the nearest projected spots having a locus in common have different characteristics.

As mentioned above the spots may comprise intersections between continuous lines. The detector can then locate the spots, or areas where the lines intersect, as described above. Preferably the illumination means projects two sets of regularly spaced lines, the two sets of lines being substantially orthogonal.

Using intersecting lines in this manner allows the detector to locate the position of the intersection points in the same manner as described above. Once the intersection points have been found and identified the connecting lines can also be used for range measurements. In effect the intersection points are used to identify the various lines in the projected array and once so identified all of the points on that line can be used to give range information. Thus the resolution of the range finding apparatus can be improved over that using only separated spots.

The detector is conveniently a two dimensional CCD array, i.e. a CCD camera. A CCD camera is a relatively cheap and reliable component and has good resolution for spot determination. Other suitable detectors would be apparent to the skilled person however and would include CMOS cameras.

Conveniently the illumination means is adapted such that the two dimensional array of spots are infrared spots. Using infrared radiation means that the spots do not affect the scene in the visible range. The detector may be adapted to capture a visible image of the scene as well as the location of the infrared spots in the scene.

The length of the baseline between the detector and the illumination means determines the accuracy of the system. The term baseline refers to the separation of the line of sight of the detector and the line of sight of the illumination means as will be understood by one skilled in the art. As the skilled person will understand the degree of apparent movement of any particular spot in the scene between two different ranges will go up as the separation or baseline between the detector and the illumination means is increased. An increased apparent movement in the scene between different ranges obviously means that the difference in range can be determined more accurately. However equally an increased baseline also means that the operating range in which there is no ambiguity is also reduced.

The baseline between the detector and the illumination means is therefore chosen according to the particular application. For a ranging apparatus intended to work over an operating distance of say 0.5 m to 2.0 m, the baseline of the detector and the illumination means is typically approximately 60 mm.

It should be noted that whilst the baseline of the apparatus will often be the actual physical separation between the detector and the illumination means this will not necessarily always be the case. Some embodiments may have mirrors, beam splitters etc in the optical path of one or both of the illumination means and the scene. In which case the actual physical separation could be large but by use of appropriate optical components the apparent separation or baseline, as would be understood by one skilled in the art, would still be small. For instance the illumination means could illuminate the scene directly but a mirror placed close to the illumination means could direct received radiation to the detector. In which case the actual physical separation could be large but the apparent separation, the baseline, would be determined by the location of the mirror and the detector, i.e. the position the detector would be if there were no mirror and it received the same radiation. The skilled person would understand that the term baseline should be taken as referring to the apparent separation between the detector and the illumination means.

The detector means may be adapted to image the scene from more than one direction. The detector could be either moveable from one location to another so as to image the scene from a different viewpoint or scanning optics could be placed in the optical path to the detector so as to periodically redirect the look direction. Both of these approaches require moving parts however and mean that the scene must be imaged over sub-frames. As an alternative the detector may comprise two detector arrays each detector array arranged so as to image the scene from a different direction. In effect two detectors (two cameras) may be used each imaging the scene from a different direction, thus increasing the amount and/or quality of range information.

Imaging the scene from more than one direction can have several advantages. Obviously objects in the foreground of the scene may obscure objects in the background of the scene from certain viewpoints. Changing the viewpoint of the detector can ensure that range information to the whole scene is obtained. Further the difference between the two images can be used to provide range information about the scene. Objects in the foreground will appear to be displaced between the two images than those in the background. This could be used to give additional range information. Also, as mentioned, in certain viewpoints one object in the foreground may obscure an object in the background—this can be used to give relative range information. The relative movement of objects in the scene may also give range information. For instance objects in the foreground may appear to move one way in the scene moving from one viewpoint to the other whereas objects in the background may appear to move the other way. The processor therefore preferably applies image processing algorithms to the scenes from each viewpoint to determine range information therefrom. The type of image processing algorithms required would be understood by one skilled in the art. The range information revealed in this way may be used to remove any ambiguity over which spot is which in the scene to allow fine ranging. The present invention may therefore use processing techniques looking at the difference in the two images to determine information about the scene using known stereo imaging techniques to augment the range information collected by analysing the positions of the projected spots.

If more than one viewpoint is used the viewpoints could be adapted to have different baselines. As mentioned the baseline between the detector and the illumination means has an effect on the range and the degree of ambiguity of the apparatus. One viewpoint could therefore be used with a low baseline so as to give a relatively low accuracy but unambiguous range to the scene over the distances required. This coarse range information could then be used to remove ambiguities from a scene viewed from a viewpoint with a larger baseline and hence greater accuracy.

Additionally or alternatively the baselines between the two viewpoints could be chosen such that if a spot detected in the scene from one viewpoint could correspond to a first set of possible ranges the same spot detected in another viewpoint could only correspond to one range within that first set. In other words imagine that a spot is detected in the scene viewed from the first viewpoint and could correspond to a first spot (1,0) at a first range $R_1$, a second spot (2,0) at a second range $R_2$, a third spot (3,0) at a third range $R_3$ and so on. The same spot could also give a possible set of ranges when viewed from the second viewpoint, i.e. it could be spot (1,0) at range $r_1$, spot (2,0) at range $r_2$, and so on. With appropriate set up of the two viewpoints and the illumination means when the two sets of ranges are compared it may be that there is only one possible range common to both sets and this therefore must be the actual range.

Where more than two viewpoints are used the baselines of at least two of the viewpoints may lie along different axes. For instance one viewpoint could be spaced horizontally relative to the illumination means and another viewpoint spaced vertically relative to the illumination means. The two viewpoints can collectively image the scene from different angles and so may reduce the problem of parts of the foreground of the scene obscuring parts of the background. The two viewpoints can also permit unambiguous determination of any spot as mentioned above but spacing the viewpoints on different axes can aid subsequent image processing of the image. Detection of edges for instance may be aided by different viewpoints as detection of a horizontal edge in a scene can be helped by ensuring the two viewpoints are separated vertically.

In a preferred embodiment the system may comprise at least three detectors arranged such that two detectors have viewpoints separated along a first axis and at least a third detector is located with a viewpoint not on the first axis. In other words the viewpoints of two of the detectors are separated in the x-direction and the viewpoint of a third camera is spaced from the first two detectors. Conveniently the system may comprise three detectors arranged in a substantially right angled triangle arrangement. The illumination means may conveniently form a rectangular or square arrangement with the three detectors. Such an arrangement gives a good degree of coverage of the scene, allowing unambiguous determination of projected spots by correlating the different images and guarantees two image pairs separated along orthogonl axes. Stereo imaging techniques could be used on the two sets of image pairs to allow all edges in the image to be analysed.

The apparatus may further comprise a plurality of illumination means arranged to illuminate the scene from different directions. The system may be adapted to periodically change the illumination means used to illuminate the scene so that only one illumination means is used at any time or the two or more illumination means may be used simultaneously and may project spots having different characteristics such as shape or colour so that the processor could work out which spots were projected by which illumination means. Having two illumination means gives some of the same benefits as described above as having two detectors. With one illumination means objects in the background may be in the shadow of objects in the foreground and hence will not be illuminated by the illumination means. Therefore it would not be possible to generate any range information. Having two illumination means could avoid this problem. Further if the detector or detectors were at different baselines from the various illumination means the differing baselines could again be used to help resolve range ambiguities.

The illumination means should ideally use a relatively low power source and produce a large regular array of spots with a large depth of field. A large depth of field is necessary when working with a large operating window of possible ranges as is a wide angle of projection, i.e. spots should be projected evenly across a wide angle of the scene and not just illuminate a small part of the scene. Preferable the illumination means projects the array of spots in an illumination angle of between 60° to 100°. Usefully the depth of field may be from 150 mm to infinity.

In a preferred embodiment therefore the illumination means comprises a light source arranged to illuminate part of the input face of a light guide, the light guide comprising a tube having substantially reflective sides and being arranged together with projection optics so as to project an array of distinct images of the light source towards the scene. The light guide in effect operates as a kaleidoscope. Light from the source is reflected from the sides of the tube and can undergo a number of reflection paths within the tube. The result is that multiple images of the light source are produced and projected onto the scene. Thus the scene is illuminated with an array of images of the light source. Where the source is a simple light emitting diode the scene is therefore illuminated with an array of spots of light. The light guide kaleidoscope gives very good image replication characteristics and projects images of the input face of the light guide in a wide angle, i.e. a large number of spots are projected in all directions. Further the kaleidoscope produces a large depth of field and so delivers a large operating window.

The light guide comprises a tube with substantially reflective walls. Preferably the tube has a constant cross section which is conveniently a regular polygon. Having a regular cross section means that the array of images of the light source will also be regular which is advantageous for ensuring the whole scene is covered and eases processing. A square section tube is most preferred. Typically, the light guide has a cross sectional area in the range of a few square millimetres to a few tens of square millimetres, for instance the cross sectional area may be in the range of 1-50 $mm^2$ or 2-25 $mm^2$. As mentioned the light guide preferably has a regular shape cross section with a longest dimension of a few millimetres, say 1-5 mm. One embodiment as mentioned is a square section tube having a side length of 2-3 mm. The light guide may have a length of a few tens of millimetres, a light guide may be between 10 and 70 mm long. Such light guides can generate a grid of spots over an angle of 50-100 degrees (typically about twice the total internal angle within the light guide). Depth of field is generally found to be large enough to allow operation from 150 mm out to infinity. Other arrangements of light guide may be suitable for certain applications however.

The tube may comprise a hollow tube having reflective internal surfaces, i.e. mirrored internal walls. Alternatively the tube may be fabricated from a solid material and arranged such that a substantial amount of light incident at an interface between the material of the tube and surrounding material undergoes total internal reflection. The tube material may be either coated in a coating with a suitable refractive index or designed to operate in air, in which case the refractive index of the light guide material should be such that total internal reflection occurs at the material air interface.

Using a tube like this as a light guide results in multiple images of the light source being generated which can be projected to the scene to form the array of spots. The light guide is easy to manufacture and assemble and couples the majority of the light from the source to the scene. Thus low power sources such as light emitting diodes can be used. As the exit aperture can be small, the apparatus also has a large depth of field which makes it useful for ranging applications which require spots projected that are separated over a wide range of distances.

Either individual light sources may be used close to the input face of the light guide to illuminate just part of the input face or one or more light sources may be used to illuminate the input face of the light guide through a mask. Using a mask with transmissive portion for passing light to a part of the light guide can be easier than using individual light sources. Accurate alignment of the mask is required at the input face of the light guide but this may be easier than accurately aligning an LED or LED array.

Preferably where a mask is used the illumination means comprises a homogensier located between the light source and the mask so as to ensure that the mask is evenly illuminated. The light source may therefore be any light source giving an acceptable level of brightness and does not need accurate alignment.

The projection optics may comprise a projection lens. The projection lens may be located adjacent the output face of the light guide. In some embodiments where the light guide is solid the lens may be integral to the light guide, i.e. the tube may be shaped at the output face to form a lens.

All beams of light projected by the apparatus according to the present invention pass through the end of the light guide and can be thought of as originating from the point at the centre of the end face of the light guide. The projection optics can then comprise a hemispherical lens and if the centre of the hemisphere coincides with the centre of the light guide output face the apparent origin of the beams remains at the same point, i.e. each projected image has a common projection origin. In this arrangement the projector does not have an axis as such as it can be thought of a source of beams radiating across a wide angle. The preferred illumination means of the present invention is therefore quite different from known structured light generators. What matters for the ranging apparatus therefore is the geometrical relationship between the point of origin of the beams and the principal point of the imaging lens of the detector.

Preferably the projection optics are adapted so as to focus the projected array at relatively large distances. This provides a sharp image at large distances and a blurred image at closer distances. As discussed above the amount of blurring can give some coarse range information which can be used to resolve ambiguities. The discrimination is improved if the light source illuminates the input face of the light guide with a non circular shape, such a square. Either a square light source could be used or a light source could be used with a mask with square shaped transmissive portions.

In order to further remove ambiguity the light source may illuminate the input of the light guide with a shape which is not symmetric about the axes of reflection of the light guide. If the light source or transmissive portion of the mask is not symmetrical about the axis of reflection the image of the light source will be different to its mirror image. Adjacent spots in the projected array are mirror images and so shaping the light source or transmissive portions of the mask in this manner would allow discrimination between adjacent spots.

The apparatus may comprise more than one light source, each light source arranged to illuminate part of the input face of the light guide. Using more than one light source can improve the spot resolution in the scene. Preferably the more than one light sources are arranged in a regular pattern. The light sources may be arranged such that different arrangements of sources can be used to provide differing spot densities. For instance a single source could be located in the centre of the input face of the light guide to provide a certain spot density. A separate two by two array of sources could also be arranged on the input face and could be used instead of the central source to provide an increased spot density.

Alternatively the mask could be arranged with a plurality of transmissive portions, each illuminate a part of the input face of the light guide. In a similar manner to using multiple sources this can increase spot density in the scene. The mask may comprise an electro-optic modulator so that the transmission characteristics of any of the transmissive portions may be altered, i.e. a window in the mask could be switched from being transmissive to non-transmissive to effectively switch certain spots in the projected array on and off.

Where more than one light sources are used at least one light source could be arranged to emit light at a different wavelength to another light source. Alternatively when using a mask with a plurality of transmissive portions the different transmissive portions could transmit different wavelengths. Using sources with different wavelengths or transmissive windows operating at different wavelengths means that the array of spots projected into a scene will have differing wavelengths, in effect the spots will be different colours—although the skilled person will appreciate that the term colour is not meant to imply operation in the visible spectrum. Having varying colours will help remove ambiguity over which spot is which in the projected array.

Alternatively at least one light source could be shaped differently from another light source, preferably at least one light source having a shape that is not symmetric about a reflection axis of the light guide. Shaping the light sources again helps discriminate between spots in the array and having the shapes non symmetrical means that mirror images will be different, further improving discrimination as described above. The same effect may be achieved using a mask by shaping the transmissive portions appropriately.

At least one light source could be located within the light guide, at a different depth to another light source. The angular separation of the projected array from a kaleidoscope is determined by the ratio of its length to its width as will be described later. Locating at least one light source within the kaleidoscope effectively shortens the effective length of light guide for that light source. Therefore the resulting pattern projected towards the scene will comprise more than one array of spots having different periods. The degree of overlap of the spot will therefore change with distance from the centre of the array which can be used to identify each spot uniquely.

The ranging system may also have a means for periodically redirecting the array of spots in the scene. The means for redirecting the array of spots in the scene is preferably adapted to displace the array of spots in the scene so as to provide new range points. Therefore the scene may be illuminated with an array of spots and the range to each of the spots determined. The array of spots may then be displaced in the scene and the range to each of the new spot positions also found. This can allow the resolution of the image in ranging terms to be increased permitting very accurate ranging of the scene.

The means for redirecting the array of spots in the scene may comprise a means of moving or tilting the illumination means. Where the illumination means is moved the baseline between the detector and illumination means may be altered and obviously this will need to be taken into account by the processor in calculating the range to each spot. Alternatively tilting the illumination means slightly may be achieved without changing the apparent baseline but resulting in a slight spot displacement As an alternative to moving the illumination means at all the means for redirecting the array of spots may comprise an optical element located in the optical path of the illumination means. For instance a wedge of refractive material could be placed in the optical path closer to the projection optics. The refractive wedge may act to deflect the radiation slightly from the path it would follow without the wedge present. The wedge may therefore be inserted or withdrawn from the optical path to redirect the array in the scene. Alternatively the wedge could be arrange to be rotated about an axis so as to deflect incident radiation in different directions as the wedge is located. The wedge could be adapted to be rotated between fixed positions and the ranging system adapted to acquire an image at each position. Thus a four fold increase in spot density can be achieved.

The ranging system of the present invention may further advantageously comprise a location sensor. Where the ranging apparatus is used in a portable device, such as a camera, it may be advantageous to know the location of the camera when an image is captured. Knowing the location of the camera and the range to objects in the captured image the location of the objects in the scene can be determined. This may be useful in a wide range of applications, especially where the captured images are being used to form a three dimensional model of a scene or object. The location sensor may comprise a GPS (Global Positioning System) receiver to give a co-ordinate location or may comprise a location sensor which determines location relative to some fixed point. For instance the location sensor may determine the location of the ranging apparatus relative to a marker beacon which has been placed at a fixed point.

The location sensor preferably determines the orientation of the sensor. This could be the orientation in terms of elevation of the ranging system, i.e. whether it is looking up or down and to what extent, or the azimuth of the system, i.e. whether it is looking east or west etc, or both. The orientation may again be determined with respect to a marker beacon. Any known orientation system may be used as will be understood by a person skilled in the art, for instance compasses, tip/tilt sensors, magnetic field sensors etc. Inertial sensors may be used to track motion of the ranging apparatus in order to determine the location and/or orientation information.

When the positional and orientation information of an image is known and the range to objects in the images is also known the images may be used to form a three dimensional model of a scene. An object or a scene such as a room could be imaged using the ranging apparatus of the present invention from several different views and the recorded images and positional and range information used to form a three dimensional model of the object or room.

Rather than track the location of a range finding apparatus of the present invention and take images of an object or scene from several different viewpoints in one embodiment of the present invention a plurality of range finding apparatuses according to the present invention may be arranged in fixed relation to each other to image a volume from different viewpoints. Imagine a plurality of range finding cameras according to the present invention are arranged in a known fixed relation and image the same volume from different angles. Any object placed in this volume will be imaged from different angles by each of the range finding cameras and the range to the object surface determined for each view. The data from these images could then be used to create a three dimensional model of the object. This could be used in a wide variety of computer aided design or modelling or simulation applications. The object need not be inanimate and could be the whole or part of a person or animal. For instance a booth could be arranged with several cameras to image a person and determine biometric information such as body size which could be used for clothes fitting, or a smaller volume could image feet say for shoe sizing or faces for recognition purposes.

The range finding apparatus according to the present invention could be used in a variety of applications. Surveying and mapping may be aided using the apparatus according to the present invention, especially the embodiment which records positional information. The invention could be implemented with underwater imaging apparatus which could aid surveying, construction and marine archaeology.

Manufacturing processes could use ranging apparatus according to the present invention either for quality control or aiding automated assembly. The apparatus could be used for aiding automatic navigation such as robotic vision, piloting of UAV/UUV (unmanned air/underwater vehicles) or automotive driving aids.

Security scanners and proximity alerts could use range information to help identify motion in a scene or classify an object in a scene. The invention could also be used for access control, an image of a person's face could for instance be used as part of an access control means, a reference image being used for comparison.

As the present invention allows very fast ranging information the ranging apparatus could be used to analyse movement. For instance the access control application described above could include the subject being recorded saying a password with the facial movements being recorded and analysed. The system could be combined with a speech recognition apparatus for added security.

As mentioned previously the projected spots may be in other wavelengths than the visible spectrum. The detector must be able to detect the spots but it may also operate outside of the visible wavelength, for instance an infrared camera or ultraviolet could be used.

Whilst a processor is required to be able to determine the range points the apparatus may comprise an image capture unit which simply captures an image of the scene illuminated with the array of spots for later processing. Therefore in another aspect of the invention there is provided an image recorder having a large depth of field comprising an illumination means for illuminating a scene with an array of spots and an imaging array for recording an image of the scene characterised in the illumination means is adapted to illuminate the scene such that the location of spots in the recorded image can be used to give a determination of range without any ambiguity. When the apparatus does not have an integral processor it is obviously not possible to locate any possible ambiguity at the time and so the illumination means is adapted to illuminate the scene such that there will be no ambiguity in range determination. All of the apparatus, methods and features described above with respect to the first aspect of the invention to remove ambiguity may be used in this aspect of the invention including shaped spots focussed at certain ranges, coloured spots, differently coloured spots and multiple viewpoints/imaging arrays. This aspect of the invention may also employ the same techniques as the first aspect of the invention for improving spot density resolution such as redirecting the spot array or activating different arrays at different times. The illumination means of this aspect of the invention is preferably the illumination means described with reference to the first aspect of the invention.

In another aspect of the invention there is provided a method of obtaining range information about a scene comprising the steps of illuminating the scene with an array of spots, taking an image of the spots in the scene, uniquely identifying each spot in the scene and determining, from the location of each spot in the scene the range to that spot.

The method may involve the step of illuminating the scene with spots which have a non-circular shape and which are focussed at one range in the operating window and unfocussed at another range in the operating window and the step of uniquely identifying each spot in the scene involves determining whether the spot is focussed or not.

The method may also involve the step of projecting the array of spots such that at least some of the projected spots are of a different shape and/or colour to other spots and the step of uniquely identifying each spot in the scene involves determining the colour and or shape of a spot.

The step of recording an image of the scene may comprise the step of recording an image of the scene from a plurality of viewpoints with the same illumination. In which case the step of uniquely identifying each spot in the scene may comprise the step of comparing the position of a spot from more than one viewpoint so as to uniquely identify that spot.

The method may further comprise the step of recording information about the position from which the image was recorded for each recorded image.

Where range information is acquired from the scene, for instance from images acquired of a particular object the information relating to the shape of the detected object could be compared to reference shapes or shape models, for instance for recognition purposes. Thus according to another aspect of the invention there is provided a method of identification comprising the step of obtaining range information about a scene according to the method described above and comparing said range information with reference shape information corresponding to an item to be identified and giving an indication of quality of match of the detected shape to the reference item. The matching step may use model coefficients or best fit methods. The item to be identified could be anything which it is wished to identify or recognise—for instance a product on a production line could be compared with a good product for quality control purposes with a bad match triggering an alarm.

The invention will now be described by way of example only with reference to the following drawings of which;

Figure 3:
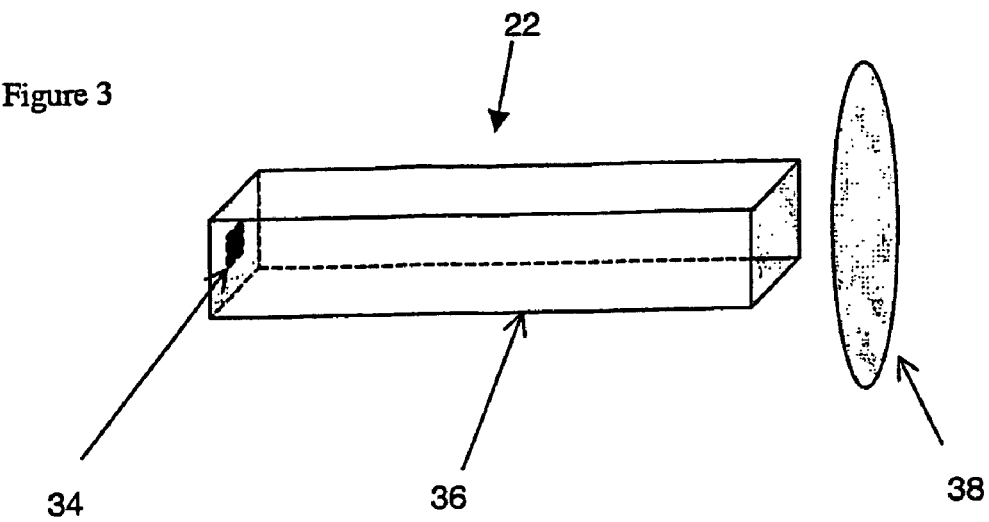
Figure 4:
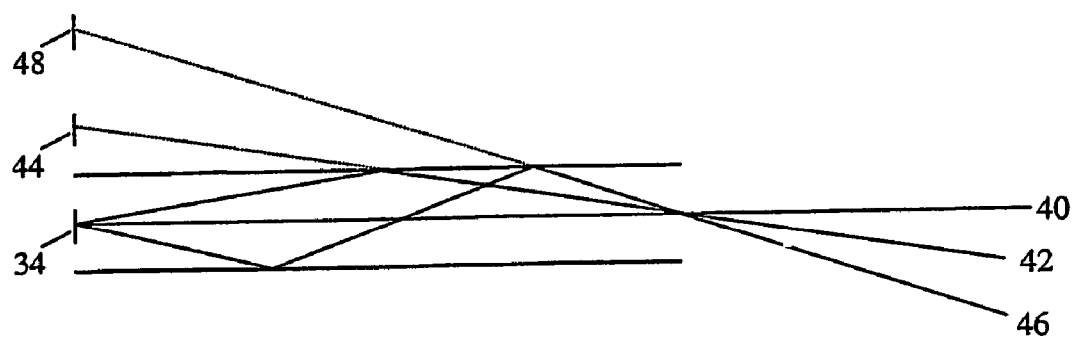
Figure 5:
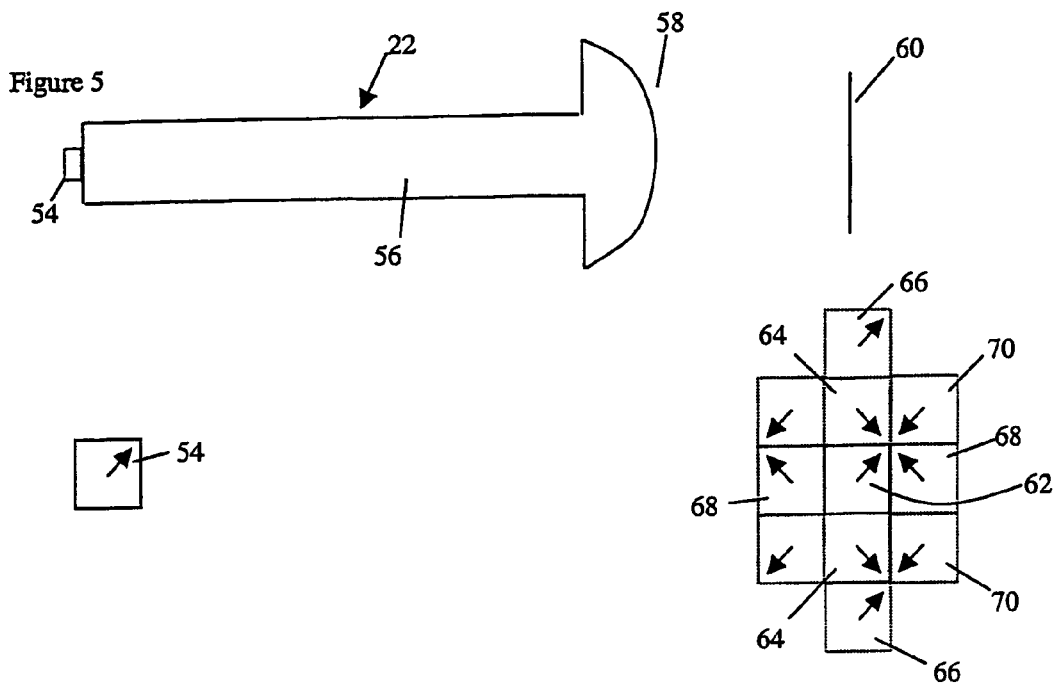
Figure 6:
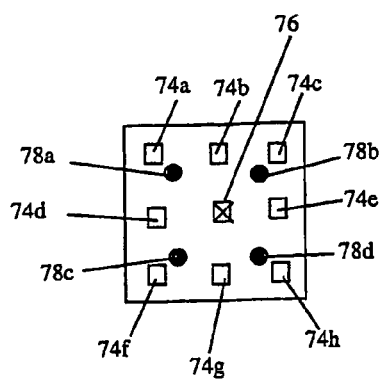
Figure 7:
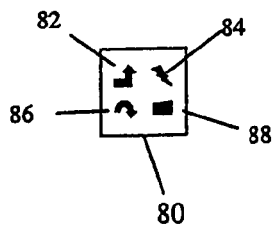
Figure 7:
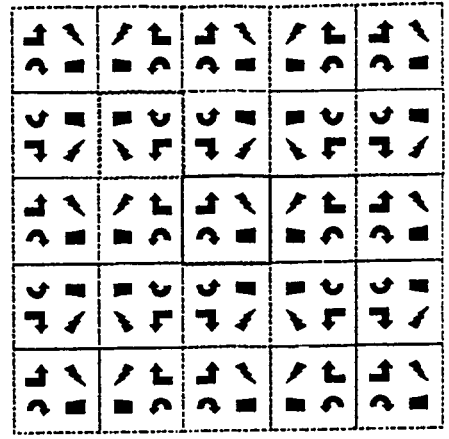
Figure 8:
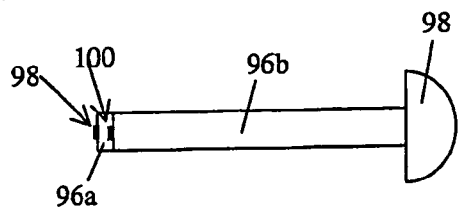
Figure 8:
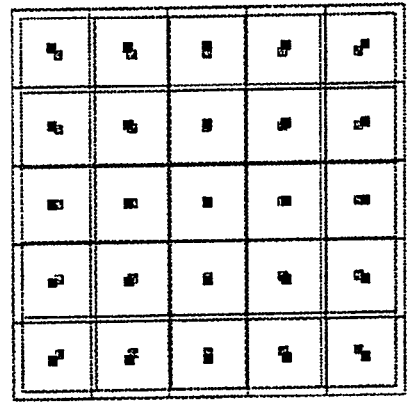
Figure 9:
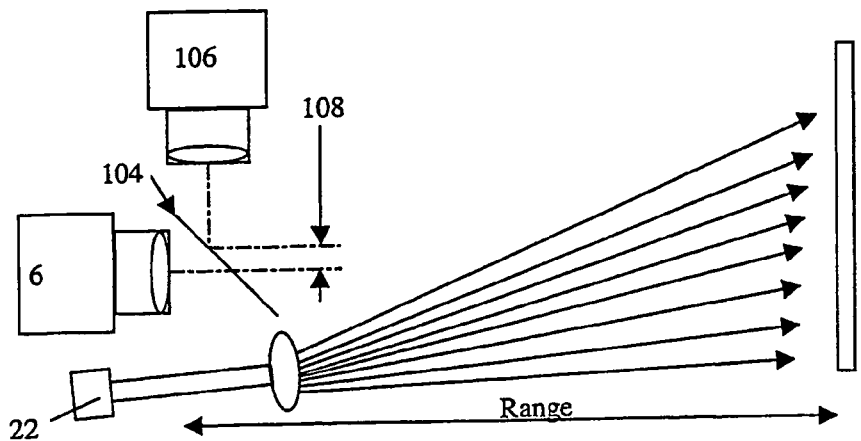
Figure 10:
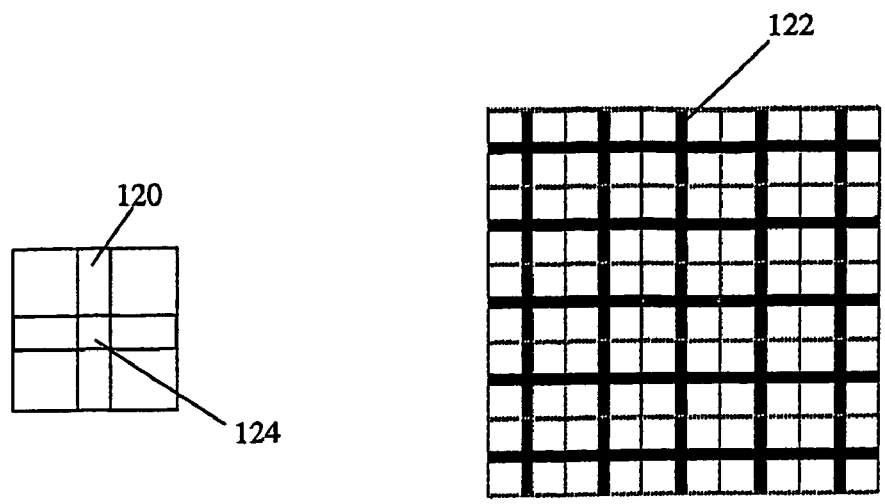
Figure 11:
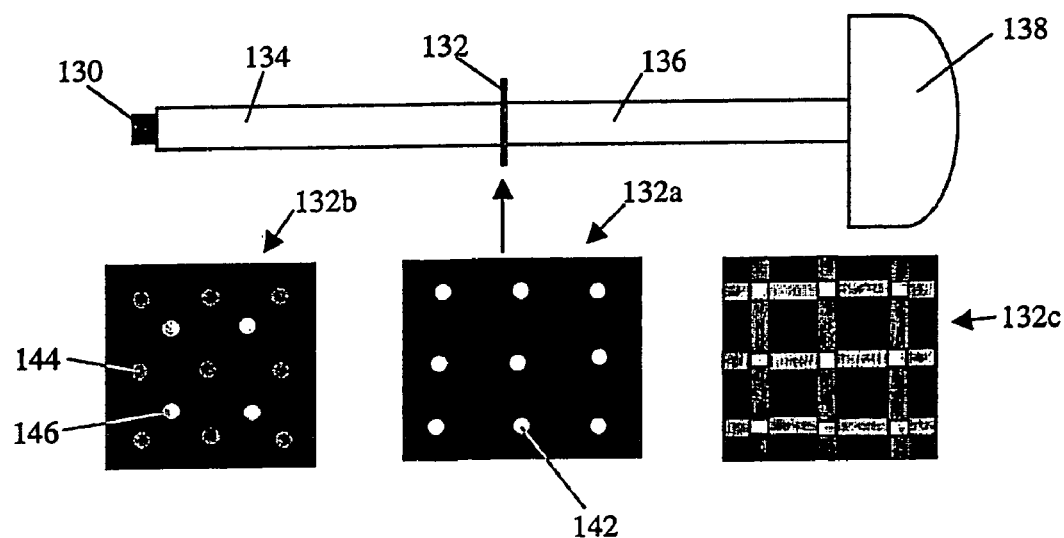
Figure 12A:
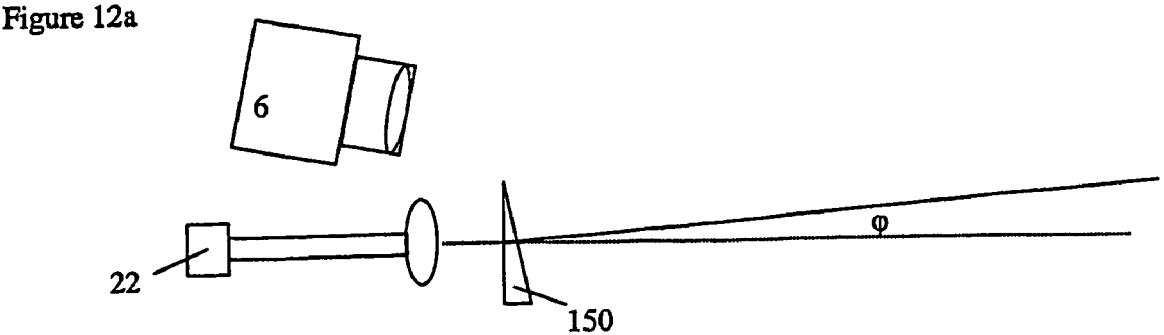
Figure 12B:
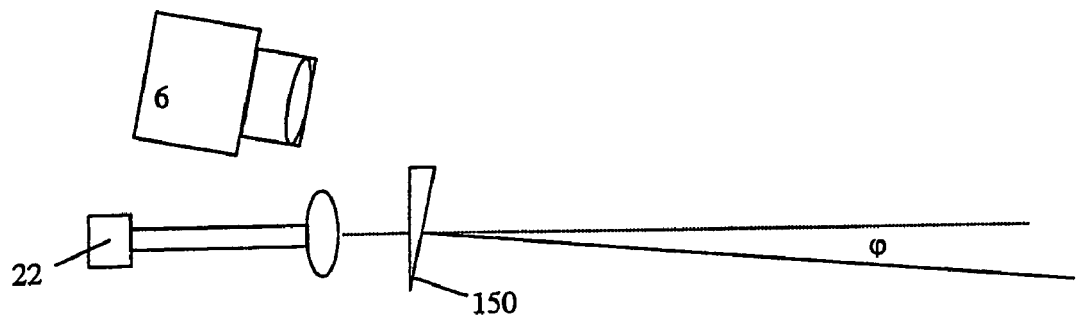
Figure 13:
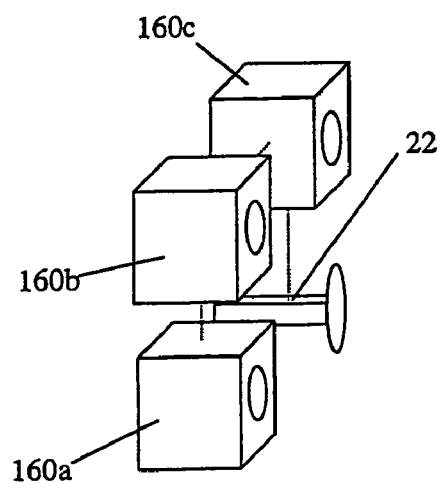

FIG. 3 shows a suitable spot projector for use in the ranging system of the present invention, FIG. 4 illustrates the principle of operation of the spot projector shown in FIG. 3, FIG. 5 shows an alternative spot projector and the output thereof, FIG. 6 shows the input face of a spot projector having variable spot density projection, FIG. 7 shows the input face of an alternative type of suitable spot projector and the pattern produced therefrom, FIG. 8 shows another suitable spot projector, FIG. 9 shows an embodiment of the invention using two cameras, FIG. 10 shows the input face of a spot projector for producing spots formed from the intersection of continuous lines, FIG. 11 shows another embodiment of a spot projector suitable for use in the present invention, FIG. 12 shows a means for redirecting the output of the spot projector so as to increase spot density, and, FIG. 13 shows a three camera ranging system according to the present invention.

FIG. 1 shows a prior art ranging system using a single spot. A scanning source 2 produces a single beam of light 4 which is projected towards a scene. Detector 6 looks towards the scene and detects where in the scene the spot is located. FIG. 1*a* shows the apparatus with a target 8 at a first range and also illustrates the scene 10 as it appears to the detector. The spot 12 can be seen at a particular location governed by the angle $\theta_1$ which is itself determined by the range to the object.

Figure 1A:
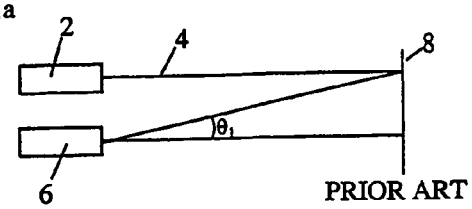
FIG. 1 shows a prior art single spot ranging system.
Figure 1A:
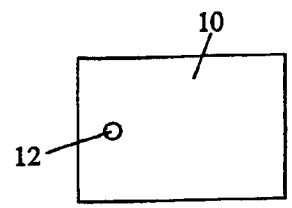
Figure 1B:
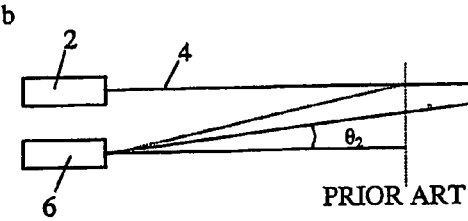
Figure 1B:
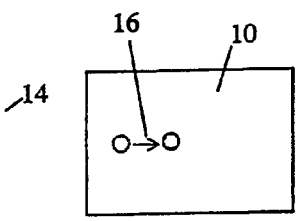

FIG. 1*b* shows the same apparatus when target 8 is removed and a new target 14 is introduced further away. The new angle $\theta_2$ to the spot is lower than $\theta_1$ and so the detector 6 sees the spot 12 in a different location. The apparent movement of the spot in the scene is shown by arrow 16.

It can be seen then that when a beam of light is projected at a known angle from the scanning source 2 the location of the spot 12 in the detected scene 10 can give range information. As the range of the target is varied the spot appears to move across the scene. The spot therefore has a locus of apparent movement across the scene with varying range which is determined by the arrangement of the source 2 and detector 6.

The prior art is limited however in that the spot must be scanned across the whole of the scene to generate range information from across the scene. Scanning requires complicated mechanical systems and means that ranging to the entire scene takes a relatively long time.

Figure 2A:
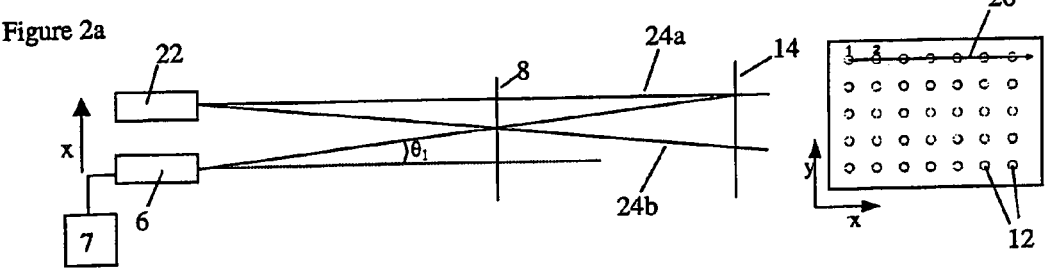
FIG. 2 shows an embodiment of the ranging system of the present invention.

The present invention uses a two dimensional array of spots to gain range information from the whole scene simultaneously. Using a two dimensional array of spots can lead to ambiguity problems as illustrated with reference to FIG. 2a. Here like components to FIG. 1 have like numerals. The arrangement is the same except for the fact that scanning source 2 is replaced with a two dimensional spot projector 22 and processor 7 is indicated. The spot projector 22 projects a plurality of angularly separated beams 24a, 24b (only two are shown for clarity). Where the scene is a flat target the image 10 the detector sees is a square array of spots 12. As can be seen from FIG. 2a though a spot appearing at a particular location in the scene, say that received at angle $\theta_1$, could correspond to a first projected spot, that from beam 24b, being reflected or scattered from a target 8 at a first range or a second, different projected spot, that from beam 24a, being reflected or scattered from a target 14 at a more distant range. Again each spot in the array can be thought of as having a locus in the scene of varying range. It can be seen that the locus for one spot, arrow 26, can overlap with the position of other spots, giving rise to range ambiguity.

Figure 2B:
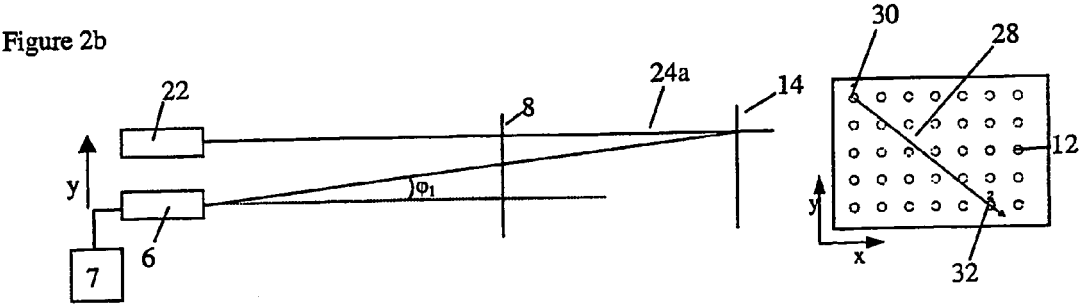

One embodiment of the present invention avoids this problem by arranging the spot projector relative to the detector such that the array of spots is projected such that the loci of possible positions in the detected scene at varying range of adjacent spots do not overlap. FIG. 2b therefore shows the apparatus of the present invention from a side elevation. It can be seen that the detector 6 and spot projector 22 are separated in the y-direction as well as the x-direction. Therefore the y-position of a spot in the scene also varies with range, which has an effect on the locus of apparent spot motion. The arrangement is chosen such that the loci of adjacent spots do not overlap. The actual locus of spot motion is indicated by arrow 28. The same effect can be achieved by rotating the projector about its axis.

Another way of thinking of this would be to redefine the x-axis as the axis along which the detector and spot projector are separated, or at least the effective input/exit pupils thereof if mirrors or other diverting optical elements were used. The z-axis is the range to the scene to be measured and the y-axis is orthogonal. The detector therefore forms a two dimensional x-y image of the scene. In this co-ordinate system there is no separation of the detector and projector in the y-direction and so a spot projected by the projector at a certain angle in the z-y plane will always be perceived to be at that angle by the detector, irrespective of range, i.e. the spot will only appear to move in the detected scene in a direction parallel to the x-direction. If the array is therefore arranged with regard to the x-axis such that adjacent spots have different separations in the y-direction there will be no ambiguity between adjacent spots. Where the array is a square array of spots this would in effect mean tilting the array such that an axis of the array does not lie along the x-axis as defined, i.e. the axis by which the detector and spot projector are separated.

For wholly unambiguous determination of which spot is which the spot size, inter-spot gap and arrangement of the detector would be such that the locus of each spot did not overlap with the locus of any other spot. However for practical reasons of discrimination a large number of spots is preferable with a relatively large spot size and the apparatus is used with a large depth of field (and hence large apparent motion of a spot in the scene). In practice then the loci of different spots will sometimes overlap. As can be seen in FIG. 2b the locus of projected spot 30 does overlap with projected spot 32 and therefore a spot detected in the scene along the line of arrow 28 could correspond to projected spot 30 at one range or projected spot 32 at a different range. However the difference in the two ranges will be significant. In some applications the ranging system may only be used over a narrow band of possible ranges and hence within the operating window there may be no ambiguity. However for most applications it will be necessary to resolve the ambiguity. As the difference in possible ranges is relatively large however a coarse ranging technique could be used to resolve the ambiguity over which spot is being considered with the ranging system then providing accurate range information based on the location of uniquely identified spots.

In one embodiment spot projector 22 projects an array of square shaped spots which is focussed at relatively long range. If the processor sees square spots in the detected scene this means that the spots are substantially focussed and so the detected spot must consequently be one which is at relatively long range. However if the observed spot is at close range it will be substantially unfocussed and will appear circular. A focal length of 800 mm may be typical. Thus the appearance of the spot may be used to provide coarse range information to remove ambiguity over which spot has been detected with the location of the spot then being used to provide fine range information.

The detector 6 is a standard two dimensional CCD array, for instance a standard CCD camera although a CMOS camera could be used instead. The detector 6 should have sufficient resolution to be able to identify the spots and the position thereof in the scene. The detector 6 may be adapted to capture a visible image as well as detect the spots in the scene. Once the range information has been processed to determine the range information in the image and hence generate a 3D surface the visible data can subsequently be superimposed on the 3D surface to generate surface details/texture, or in the case of faces, a "3D mask".

The spot projector may project spots in the visible waveband which may be detected by a camera operating in the visible band. However the spot projector may project spots at other wavelengths, for instance infrared or ultraviolet. Where the spot projector projects infrared spots onto the scene the detector used is a CCD camera with four elements to each pixel group. One element detects red light, another blue light and a third green light. The fourth element in the system is adapted to detect infrared light at the appropriate wavelength. Thus the readout from the RGB elements can be used to form a visible image free from any spots and the output of the infrared elements, which effectively contains only the infrared spots, provided to the processor to determine range. Where spots are projected at different wavelengths however as will be described later the detector must be adapted to distinguish between different infrared wavelengths, in which case a different camera may be preferred. The detector is not limited to working in the visible band either. For instance a thermal camera may be used. Provided the detector is able to detect the projected spots it doesn't matter whether the detector also has elements receiving different wavelengths.

In order to aid spot detection and avoid problems with ambient light the spot projector is adapted to project a modulated signal. The processor is adapted to filter the detected signal at the modulation frequency to improve the signal to noise ratio. The simplest realisation of this principle is to use a pulsed illumination, known as strobing or flash illumination. The camera captures one frame when the pulse is high. A reference pulse is also taken without the spots projected.

The difference of these intensity patterns is then corrected in terms of background lighting offsets. In addition a third reflectivity reference frame could be collected when synchronised to a uniformly illuminated LED flashlamp which would allow a normalisation of the intensity pattern.

A suitable spot projector 22 is shown in FIG. 3. A light source 34 is located adjacent an input face of a kaleidoscope 36. At the other end is located a simple projection lens 38. The projection lens is shown spaced from the kaleidoscope for the purposes of clarity but would generally be located adjacent the output face of the kaleidoscope.

The light source 34 is an infrared emitting light emitting diode (LED). As discussed above infrared is useful for ranging applications as the array of projected spots need not interfere with a visual image being acquired and infrared LEDs and detectors are reasonably inexpensive. However the skilled person would appreciate that other wavelengths and other light sources could be used for other applications without departing from the spirit of the invention.

The kaleidoscope is a hollow tube with internally reflective walls. The kaleidoscope could be made from any material with suitable rigidity and the internal walls coated with suitable dielectric coatings. However the skilled person would appreciate that the kaleidoscope could alternatively comprise a solid bar of material. Any material which is transparent at the wavelength of operation of the LED would suffice, such as clear optical glass. The material would need to be arranged such that at the interface between the kaleidoscope and the surrounding air the light is totally internally reflected within the kaleidoscope. This may be achieved using additional (silvering) coatings, particularly in regions that may be cemented with potentially index matching cements/epoxys etc. Where high projection angles are required this could require the kaleidoscope material to be cladded in a reflective material. An ideal kaleidoscope would have perfectly rectilinear walls with 100% reflectivity. It should be noted that a hollow kaleidoscope may not have an input or output face as such but the entrance and exit to the hollow kaleidoscope should be regarded as the face for the purposes of this specification.

The effect of the kaleidoscope tube is such that multiple images of the IED can be seen at the output end of the kaleidoscope. The principle is illustrated with reference to FIG. 4. Light from the LED 34 may be transmitted directly along the kaleidoscope undergoing no reflection at all—path 40. Some light however will be reflected once and will follow path 42. Viewed from the end of the kaleidoscope this will result in a virtual source 44 being seen. Light undergoing two reflections would travel along path 46 resulting in another virtual source 48 being observed.

The dimensions of the device are tailored for the intended application. Imagine that the LED 34 emits light into a cone with a full angle of 90°. The number of spots viewed on either side of the centre, unreflected, spot will be equal to the kaleidoscope length divided by its width The ratio of spot separation to spot size is determined by the ratio of kaleidoscope width to LED size. Thus a 200 μm wide LED and a kaleidoscope 30 mm long by 1 mm square will produce a square grid of 61 spots on a side separated by five times their width (when focussed). The spot projector may typically be a few tens of millimetres long and have a square cross section with a side in the range of 2 to 5 mm long, say 3 to 4 mm square. For typical applications the spot projector is designed to produce an array of 40×30 spots or greater to be projected to the scene. A 40 by 30 array generates up to 1200 range points in the scene although 2500 range points may preferred with the use of intersection lines allowing up to 10,000 range points.

Projection lens 38 is a simple singlet lens arranged at the end of kaleidoscope and is chosen so as to project the array of images of the LED 34 onto the scene. The projection geometry again can be chosen according to the application and the depth of field required but a simple geometry is to place the array of spots at or close to the focal plane of the lens. The depth of field of the projection system is important as it is preferable to have a large depth of field to enable the ranging apparatus to accurately range to objects within a large operating window. A depth of field of 150 mm out to infinity is achievable and allows useful operating windows of range to be determined.

As mentioned LED 34 may be square in shape and projection lens 38 could be adapted to focus the array of spots at a distance towards the upper expected range such that the degree of focus of any particular spot can yield coarse range information.

A spot projector as described has several advantages. The kaleidoscope is easy and inexpensive to manufacture. LEDs are cheap components and as the kaleidoscope efficiently couples light from the LED to the scene a relatively low power source can be used. The spot projector as described is therefore an inexpensive and reasonably robust component and also gives a large depth of focus which is very useful for ranging applications. A kaleidoscope based spot projector is thus preferred for the present invention. Further the spot projector of the present invention can be arranged so as to effectively have no specific axis. As illustrated with respect to FIG. 4 all beams of light emitted by the spot projector pass through the end of the kaleidoscope and can be thought of as passing through the centre of the output face. Where projection lens 38 is a hemispherical lens with its axis of rotation coincident with the centre of the output face (as better shown in FIG. 5 with integral lens 58) then all beams of light appear to originate from the output face of the kaleidoscope and the projector acts as a wide angle even projector.

The skilled person would appreciate however that other spot projectors could be used to generate the two dimensional array. For instance a laser could be used with a diffractive element to generate a diffraction pattern which is an array of spots. Alternatively a source could be used with projection optics and a mask having an array of apertures therein. Any source that is capable of projecting a discrete array of spots of light to the scene would suffice, however the depth of field generated by other means, LED arrays, microlens arrays, projection masks etc., has generally been found to be very limiting in performance.

An apparatus as shown in FIG. 2 was constructed using a spot projector as shown in FIG. 3. The spot projector illuminated the scene with an array of 40 by 30 spots. The operating window was 60° full angle. The spots were focussed at a distance of 1 m and the ranging device worked well in the range 0.5 m to 2 m. The detector was a 308 kpixel (VGA) CCD camera. The range to different objects in the scene were measured to an accuracy of 0.5 mm at mid range.

Before the apparatus as described above can be used to produce range data, it must first be calibrated. In principle, the calibration can be generated from the geometry of the system. In practice, it is more convenient to perform a manual calibration. This allows for imperfections in construction and is likely to produce better results.

Calibration data are obtained by placing a test object at a series of known distances and recording the spot positions as a function of range. The most convenient test object is a flat, matt plane of uniform colour, preferably white, which fills the field of view of the camera at all ranges. A flat white wall would be ideal (obviously the camera would move in this case), however any deviations from flatness would affect the accuracy of the calibration.

Initially, the camera is placed at a large distance from the wall, about 1.5 m would do for the system described above, and the location of each spot in the image is recorded (spot-finding algorithms are described below). As the camera moves closer to the wall all the spots in the image move in roughly the same direction so it is a fairly simple matter to track them. The spots move along a straight line in the image as is apparent from the explanations above. A linear regression provides the formula for the track of each line in the form:

$$b = ma + c$$

where the coordinates of the spot are (a,b).

The design of the kaleidoscope projector ensures that all beams appear to originate from a common origin. Therefore, all the tracks of the spots intersect at a common point, which is the projection of the beam origin, through the principal point of the camera lens, onto the camera focal plane. This track origin can be calculated by finding the intersection of the measured spot tracks. In practice, the spot tracks are unlikely to all intersect at the same point due to uncertainties in the measurements. It is sufficient to select one of the tracks and find the intersection point of this track with all the others. This will produce a series of values for the coordinates of the origin. The position of the origin can then be determined by selecting the median value of each coordinate.

The next stage in the calibration procedure is to determine an identifier, i, for each track, which can be used for determining the identity of spots when the camera is used to produce range data. Two possible identifiers have been identified. If the spot tracks are all parallel then the gradient, m, of all the lines is the same. The intercept, c, is then the identifier. If the tracks are not parallel, then the angle between the line joining the midpoint of each track to the track origin and the x-axis is the identifier. The final stage of the calibration is to determine the relationship between the spot position along a track and the range. This can be found according to the formula:

$$z - z_0 = k/(r - r_0)$$

where z is the range along the z-axis and r is the position of the spot along the track. The position r can be measured along any convenient axis but the most convenient measure is to express r as a distance from the track origin. The constants k, $z_0$ and $r_0$ for each track can be found by fitting the formula above to the measured data. In a well-aligned system, the values for k and $z_0$ should be similar for all tracks.

The outcome of the calibration procedure consists of the track origin and a list of six numbers for each track: i, m, c, k, $r_0$, $z_0$.

After calibration the system is ready to determine range. The range finding algorithm consists of four basic stages. These are:

| | |
|---|---|
| 1 | Normalise the image |
| 2 | Locate the spots in the image. |
| 3 | Identify the spots |
| 4 | Calculate range data |

Normalisation

Since the camera has been filtered to select only light from the kaleidoscope, there should be a very low level of background light in the image. Therefore, any regions that are bright in comparison to the local background can be reasonably expected to be spots. However, the relative brightnesses of different spots will vary according to the range, position and reflectivity of the target. It is therefore convenient as a first step to normalise the image to remove unwanted background and highlight the spots. The normalisation procedure consists of calculating the 'average' intensity in the neighbourhood of each pixel, dividing the signal at the pixel by its local average and then subtracting unity. If the result of this calculation is less than zero, the result is set to zero.

Spot Location

Spot location consists of two parts. The first is finding the spot. The second is determining its centre. The spot-finding routine maintains two copies of the normalised image. One copy (image A) is changed as more spots are found. The other (image B) is fixed and used for locating the centre of each spot. As it is assumed that all bright features in the normalised images are spots, the spots can be found simply by locating all the bright regions in the image. The first spot is assumed to be near the brightest point in image A. The coordinates of this point are used to determine the centre of the spot and an estimate of the size of the spot (see below). The intensity in the region around the spot centre (based on the estimated spot size) is then set to zero in image A. The brightest remaining point in image A is then used to find the next spot and so on.

The spot-finding algorithm described above will find spots indefinitely unless extra conditions are imposed. Three conditions have been identified, which are used to terminate the routine. The routine terminates when any of the conditions is met. The first condition is that the number of spots found should not exceed a fixed value. The second condition is that the routine should not repeatedly find the same spot. This occurs occasionally under some lighting conditions. The third condition is that the intensity of the brightest point remaining in image A falls below a predetermined threshold value. This condition prevents the routine from finding false spots in the picture noise. Usually the threshold intensity is set to a fraction (typically 20%) of the intensity of the brightest spot in image B.

The centre of each spot is found from image B using the location determined by the spot-finding routine as a starting point. A sub-image is taken from image B, centred on that point. The size of the sub-image is chosen to be slightly larger than the size of a spot. The sub-image is reduced to a one-dimensional array by adding the intensity values in each column. The array (or its derivative) is then correlated with a gaussian function (or it's derivative) and the peak of the correlation (interpolated to a fraction of a pixel) is defined as the centre of the spot in the horizontal direction. The centre of the spot in the orthogonal direction is found in a similar manner by summing rows in the sub-image instead of columns.

If the centre of the spot determined by the procedure above is more than two pixels away from the starting point, the procedure should be repeated iteratively, using the calculated centre as the new starting point. The calculation continues until the calculated position remains unchanged or a maximum number of iterations is reached. This allows for the possibility that the brightest point is not at the centre of the spot. A maximum number of iterations (typically 5) should be used to prevent the routine from hunting in a small region. The iterative approach also allows spots to be tracked as the range to an object varies, provided that the spot does not move too far between successive frames. This feature is useful during calibration.

Having found the centre of the spot, the number of pixels in the sub-image with an intensity greater than a threshold value (typically 10% of the brightest pixel in the sub-image) is counted. The spot size is defined as the square root of this number, and may be used for additional coarse range information.

The outcome of the spot locating procedure is a list of (a,b) coordinates, each representing a different spot.

Spot Identification

The range to each spot can only be calculated if the identity of the spot can be determined. The simplest approach to spot identification is to determine the distance from the spot to each spot track in turn and eliminate those tracks that lie outside a pre-determined distance (typically less than one pixel for a well-calibrated system). This approach may be time-consuming when there are many spots and many tracks. A more efficient approach is to calculate the identifier for the spot and compare it with the identifiers for the various tracks. Since the identifiers for the tracks can be pre-sorted, the search can be made much quicker. The identifier is calculated in the same way as in the calibration routine.

Once candidate tracks have been identified, it is necessary to consider the position of the spot along the track. If the range of possible distances is limited, (e.g. nothing can be closer than, say, 150 mm or further than 2500 mm) then many of the candidate tracks will be eliminated since the calculated range will be outside possible boundaries. In a well-adjusted system, at most two tracks should remain. One track will correspond to a short range and the other to a much longer range.

A final test is to examine the shape of the spot in question. As described the projector 22 produces spots that are focussed at long ranges and blurred at short ranges. Provided that the LEDs in the projector have a recognisable shape (such as square) then the spots will be round at short distances and shaped at long distances. This should remove any remaining range ambiguities.

Any spots that remain unidentified are probably not spots at all but unwanted points of light in the scene.

Range Calculation

Once a spot has been identified, its range can be calculated. In order to produce a valid 3-dimensional representation of the scene it is also necessary to calculate x and y-coordinates. These can simply be derived from the camera properties. For example, for a camera lens of focal length f with pixel spacing p, the x- and y-coordinates are simply given by:

$x = zap/f, y = zbp/f$ where a and b are measured in pixel coordinates.

The embodiment described above was adjusted so as to have minimal ambiguity between possible spots and use focus to resolve the ambiguity. Other means of resolving ambiguity may be employed however. In one embodiment of the invention the apparatus includes a spot projector generally as described with reference to FIG. 3 but in which the light source is shaped so as to allow discrimination between adjacent spots. Where the light source is symmetric about the appropriate axes of reflection the spots produced by the system are effectively identical. However where a non symmetrically shaped source is used adjacent spots will be distinguishable mirror images of each other. The principle is illustrated in FIG. 5.

The structured light generator 22 comprises a solid tube of clear optical glass 56 having a square cross section. A shaped LED 54 is located at one face. The other end of tube 56 is shaped into a hemispherical projection lens 58. Kaleidoscope 56 and lens 58 are therefore integral which increases optical efficiency and eases manufacturing as a single moulding step may be used. Alternatively a separate lens could be optically cemented to the end of a solid kaleidoscope with a plane output face.

For the purposes of illustration LED 54 is shown as an arrow pointing to one corner of the kaleidoscope, top right in this illustration. The image formed on a screen 60 is shown. A central image 62 of the LED is formed corresponding to an unreflected spot and again has the arrow pointing to the top right. Note that in actual fact a simple projection lens will project an inverted image and so the images formed would actually be inverted. However the images are shown not inverted for the purposes of explanation. The images 64 above and below the central spot have been once reflected and therefore are a mirror image about the x-axis, i.e. the arrow points to the bottom right. The next images 66 above or below however have been twice reflected about the x-axis and so are identical to the centre image. Similarly the images 68 to the left and right of the centre image have been once reflected with regard to the y-axis and so the arrow appears to point to the top left. The images 70 diagonally adjacent the centre spot have been reflected once about the x-axis and once about the y-axis and so the arrow appears to point to the bottom left. Thus the orientation of the arrow in the detected image gives an indication of which spot is being detected. This technique allows discrimination between adjacent spots but not subsequent spots.

In another embodiment more than one light source is used. The light sources could be used to give variable resolution in terms of spot density in the scene, or could be used to aid discrimination between spots, or both.

For example if more than one LED were used and each LED was a different colour the pattern projected towards the scene would have different coloured spots therein. The skilled person would appreciate that the term colour as used herein does not necessarily mean different wavelengths in the visible spectrum but merely that the LEDs have distinguishable wavelengths.

The arrangement of LEDs on the input face of the kaleidoscope effects the array of spots projected and a regular arrangement is preferred. To provide a regular array the LEDs should be regularly spaced from each other and the distance from the LED to the edge of the kaleidoscope should be half the separation between LEDs.

FIG. 6 shows an arrangement of LEDs that can be used to give differing spot densities. Thirteen LEDs are arranged on the input face 72 of a square section kaleidoscope. Nine of the LEDs, 76 & 74*a-h*, are arranged in a regular 3×3 square grid pattern with the middle LED 76 centred in the middle of the input face. The remaining four LEDs, 78*a-d* are arranged as they would be to give a regular 2×2 grid. The structured light generator can then be operated in three different modes. Either the central LED 76 could be operated on its own, this would project a regular array of spots as described above, or multiple LEDs could be operated. For instance, the four LEDs 78*a-d* arranged in the 2×2 arrangement could be illuminated to give an array with four times as many spots produced than with the centre LED 76 alone.

The different LED arrangements could be used at different ranges. When used to illuminate scenes where the targets are at close range the single LED may generate a sufficient number of spots for discrimination. At intermediate or longer ranges however the spot density may drop below an acceptable level, in which case either the 2×2 or 3×3 array could be used to increase the spot density. As mentioned the LEDs could be different colours to improve discrimination between different spots.

Where multiple sources are used appropriate choice of shape or colour of the sources can give further discrimination. This is illustrated with respect to FIG. 7. Here a 2×2 array of differently shaped sources, 82, 84, 86, 88 is illustrated along with a portion of the pattern produced. One can think of the resultant pattern formed as a tiled array of images of the input face 80 of the kaleidoscope with each adjacent tile being a mirror image of its neighbour about the appropriate axis. Looking just in the x-axis then the array will be built up by spots corresponding to LEDs 82 and 84 and followed by spots corresponding to their mirror images. The resultant pattern means that each spot is different from its next three nearest neighbours in each direction and ambiguity over which spot is being observed by a detector would be reduced.

Where multiple sources are used the sources may be arranged to be switched on and off independently to further aid in discrimination. For instance several LEDs could be used, arranged as described above, with each LED being activated in turn. Alternatively the array could generally operate with all LEDs illuminated but in response to a control signal from the processor which suggests some ambiguity could be used to activate or deactivate some LEDs accordingly.

All of the above embodiments using shaped LEDs or LEDs or different colours can be combined with appropriate arrangement of the detector and spot projector such that where the locus of a spot overlaps with another spot the adjacent spots on that locus have different characteristics. For example, referring back to FIG. 2b it can be seen that the arrangement is such that the locus of spot 30 overlaps with spot 32, i.e. a spot detected at the position of spot 32 shown could correspond to projected spot 32 reflected from a target at a first range or projected spot 30 reflected from a target at a different range. However imagine that the spot projector of FIG. 5 were used. It can been seen that if projected spot 30 were an arrow pointing to the upper right then projected spot 32, but virtue of its position in the array, would be an arrow pointing to the upper left. Thus there would be no ambiguity over which spot was which as the direction of the arrow would indicate which spot was being observed.

In an alternative embodiment of spot projector shown in FIG. 11 a light source 130 illuminates the kaleidoscope 136 through mask 132. The kaleidoscope 136 and projection lens 138 may be the same as described above with reference to FIG. 5. Light source 130 is a bright LED source arranged to illuminate mask 132 through homogeniser 134. Homogeniser 134 simply acts to ensure uniform illumination of mask 132 and so may is a simple and relatively inexpensive plastic light pipe.

Mask 132 is arranged to have a plurality of transmissive portions, i.e. windows, so that only part of the light from the LED 130 is incident on the input face of the kaleidoscope 136. A suitable mask is illustrated as 132a which has a plurality of apertures 142 for transmitting light. Each aperture will act as a separate light source in the same manner as described above with respect to FIG. 6 and so the kaleidoscope will replicate an image of the apertures in the mask 132a and project an array of spots onto the scene.

Mask 132 may be fabricated and accurately aligned with respect to the kaleidoscope 136 more easily than an LED array which would require small LEDs. Thus the manufacture of the spot projector may be simplified by use of a mask. The transmissive portions of the mask may be shaped so as to act as shaped light sources as described above with respect to FIGS. 5 and 7. Therefore the mask may allow an array of spots of different shapes to be projected and shaping of the transmissive portions of the mask may again be easier than providing shaped light sources.

Further the different transmissive portions of the mask may transmit at different wavelengths, i.e. the windows may have different coloured filters. Mask 132c shows an array having windows of two different colours, windows 144 may be red say whilst windows 146 may be green. Again however the invention is not limited to particular colours nor operation in the visible waveband.

Some of the transmissive windows may have a transmission characteristic which can be modulated, for instance the mask may comprise an electro-optic modulator. Certain windows in the mask may then be switched from being transmissive to non transmissive so as to deactivate certain spots in the projected array. This could be used in a similar fashion to the various arrays described with reference to FIG. 6 to give different spot densities or could be used to deactivate certain spots in the array so as to resolve a possible ambiguity.

In a further embodiment light sources are arranged at different depths within the kaleidoscope. The angular separation of adjacent beams from the kaleidoscope depends upon the ratio between the length and width of the kaleidoscope as discussed above. FIG. 8 shows a square section kaleidoscope 96 and projection lens 98. The kaleidoscope tube 96 is formed from two pieces of material 96a and 96b. A first LED 98 is located at the input face of the kaleidoscope as discussed above. A second LED 100 is located at a different depth within the kaleidoscope, between the two sections 96a and 96b of the kaleidoscope. The skilled person would be well aware of how to join the two sections 96a and 96b of kaleidoscope to ensure maximum efficiency and located the second LED 100 between the two sections.

The resulting pattern contains two grids with different periods, the grid corresponding to the second LED 100 partially obscuring the grid corresponding to the first LED 98. As can be seen the degree of separation between the two spots varies with distance from the centre spot. The degree of separation or offset of the two grids could then be used to identify the spots uniquely. The LEDs 98, 100 could be different colours as described above to improve discrimination.

It should be noted that the term spot should be taken as meaning a point of light which is distinguishable. It is not intended to limit to an entirely separate area of light.

FIG. 10 for instance illustrates an alternative spot projector that could be used. Here a cross shaped LED 120 is used on the input face of the kaleidoscope. The LED 120 extends to the side walls of the kaleidoscope and so the projected pattern will be a grid of continuous lines 122 as illustrated. The intersection of the lines provides an identifiable area or spot which can be located and the range determined in the same manner as described above.

Once the range to the intersection has been determined the range to any point on the line passing through that intersection can be determined using the information gained from the intersection point. Thus the resolution of the system is greatly magnified. Using the same 40×30 projection system described above but with the LED arrangement shown in FIG. 10 there are 1200 intersection points which can be identified to a system with far more range points. The apparatus could be used therefore with the processor arranged to identify each intersection point and determine the range thereto and then work out the range to each point on the connecting lines. Alternatively the cross LED could comprise a separate centre portion 124 which can be illuminated separately. Illumination of the central LED portion 124 would cause an array of spots to be projected as described earlier. Once the range to each spot had been determined the rest of cross LED 120 could be activated and the range to various points on the connecting lines determined. Having the central portion only illuminated first may more easily allow ambiguities to be resolved based on shaped of the projected spots. An intersecting array of lines can also be produced using a spot projector having a mask such as shown in FIG. 11. Mask 132c shows a suitable mask for producing an array of lines. Again parts of the mask may be switchable so as to switch between a spot array and the array of lines if required.

Another embodiment of the invention is shown in FIG. 9. Here two CCD cameras 6, 106 are used to look at the scene. Spot projector 22 may be any of the spot projectors described above and projects a regular array of spots or crosses. CCD camera 6 is the same as described above with respect to FIG. 2. A second camera 106 is also provided which is identical to camera 6. A beamsplitter 104 is arranged so as to pass some light from the scene to camera 6 and reflect some light to camera 106. The arrangement of camera 106 relative to beamsplitter 104 is such that there is a small difference 108 in the effective positions of the two cameras. Each camera therefore sees a slightly different scene. If the camera positions were sufficiently far removed the beamsplitter 104 could be omitted and both cameras could be oriented to look directly towards the scene but the size of components and desired spacing may not allow such an arrangement.

The output from camera 6 could then be used to calculate range to the scene as described above. Camera 106 could also be used to calculate range to the scene. The output of each camera could be ambiguous in the manner described above in that a detected spot may correspond to any of one of a number of possible projected spots at different ranges. However as the two cameras are at different spacings the set of possible ranges calculated for each detected spot will vary. Thus for any detected spot only one possible range, the actual range, will be common to the sets calculated for each camera.

When camera 6 is located with a very small baseline, i.e. separation of line of sight, from the spot projector the corresponding loci of possible positions of spots in the scene at different ranges are small. Referring back to FIG. 2a it can be seen that if the separation from the detector 6 to the spot projector 22 is small the apparent movement in the scene of a spot at different ranges will not be great. Thus the locus will be small and there may be no overlap between loci of different spots in the operating window, i.e. no ambiguity. However a limited locus of possible positions means that the system is not as accurate as one with a greater degree of movement. For a system with reasonable accuracy and range a baseline of approximately 60 mm would be typical. Referring to FIG. 9 then if camera 6 is located close to the line of sight of the spot projector the output from camera 6 would be a non ambiguous but low accuracy measurement. Camera 106 however may be located at an appropriate baseline from the spot projector 22 to give accurate results. The low accuracy readings from the output from camera 6 could be used to resolve any ambiguity in the readings from camera 106.

Alternatively the outputs from the two camera themselves could be used to give coarse ranging. If the arrangement is such that the baseline between the cameras is small, say about 2 mm, the difference in detected position of a spot in the two cameras can be used to give a coarse estimate of range. The baseline between either camera and the projector may be large however. The advantage of this configuration is that the two cameras are looking at images with very small differences between them. The camera to projector arrangement needs to determine spot location by correlation of the recovered spot with a stored gaussian intensity distribution to optimise the measurement of the position of the spot. This is reasonable but never a perfect match as the spot sizes change with range and reflectivity may vary across the spot. Surface slope of the target may also effect the apparent shape. The camera to camera system looks at the same, possibly distorted spot, from two viewpoints which means that the correlation is always nearly a perfect match. This principle of additional camera channels to completely remove ambiguity or add information can be realised to advantage, using cameras to generate near orthogonal baselines and/or as a set of three to allow two orthogonal stereo systems to be generated. FIG. 13 shows an arrangement of a three camera system wherein the three cameras 160 and spot projector 22 are located in the same plane in a square arrangement. This arrangement allows cameras 160a and 160b to generate a vertical image pair and cameras 160b and 160c to generate a horizontal image pair to which stereo imaging techniques may be applied. This can allow analysis of edges in the image which can be coupled with the range information obtained through processing the spot positions.

To improve resolution of acquired range points one embodiment of the invention shown in FIG. 12 has an optical means for displacing the projected array in the scene. A spot projector 22 such as described above is arranged with a camera 6. However in front of the spot projector 22 is a refractive wedge 150. The effect of the refractive wedge is to deflect slightly the light from the spot projector. As shown the light is deflected by a small angle $\phi$ from the path it would take where the wedge omitted. The wedge 150 is mounted for rotation and as it rotates changes the direction in which the light is deflected. FIG. 12a shows a first position and FIG. 12b shows the situation after the wedge has been rotated through 180°. The wedge is arranged to be rotated between four positions, each 90° apart, and the camera takes an image at each position. The effect is to dither the array of spots in the scene. The angle $\phi$ is small so that the spots move only a fraction of the observed inter spot spacing. There in each of the four images acquired the spots are observed at different positions and in this way more range points to the scene are taken which can be collated together to give one accurate range map.

It should generally be noted that as the kaleidoscope spot projector as described above does not have an optical axis as generally understood there is no need to align this optical axis to the principal axis of the detector. It is generally arranged so that the best spot pattern is observed in the operating range which is usually when the spot projector is inclined with respect to the detector to place the brightest region of the spot pattern in the centre of the detector image at the likely working distance. Even when a spot projector is used that does have an optical axis the best result is still generally obtained with the axes inclined and not necessarily parallel as suggested in U.S. Pat. No. 4,867,570.

A ranging system as described could be used in any number of applications. As the spot projection system is easy and inexpensive to manufacture and need not interfere with a visible image being acquired virtually any camera system could be integrated with a ranging system according to the present invention. Ranging systems according to the present invention could be used to improve imaging target identification systems as the range to the scene would reveal addition information about object edges. This could be used in security applications for intruder alarms and the like. Alternatively range information could improve object identification, for instance facial recognition.

The apparatus could also be used in a wide range of surveying or mapping applications. When used in such applications the range finding camera may comprise a location sensor for determining the location of the camera as each image of the scene is recorded. The location sensor could comprise a GPS receiver, a tip/tilt sensor and a magnetic field sensor. Alternatively a beacon such as a magnetic field source could be placed in a known position and a magnetic field gradiometer used to determine the location of the camera relative to the beacon. Inertial sensors could also be used to record how the camera is moved. In this way the position and orientation of the camera is known when the image is taken. Knowing the exact location and orientation of the camera means that range information to objects in a scene can be translated into positional information about the scene. For instance imagine several images are taken of a room from different viewpoints. Each image (and here image means the recorded layout of spots in the observed scene and not necessarily a complete contrast image of the scene) can be used to create a model that part of the scene observed. When several images are taken and the position of the camera each time known the data from the various images can be used to create one three dimensional model of the room. As mentioned this could find application for surveying and mapping. Objects may also be imaged from various directions and the data used to create a three dimensional model which is useful for computer aided design and simulation or modelling s well as creating virtual reality environments.

The system has obvious potential for use in proximity sensors, for instance such as those employed in vehicles. Also in vehicles range information could be collected about the occupant position which could be used in safer deployment of emergency safety equipment such as air bags. The apparatus could be used in robotic vision systems as range information would help a robotic system navigate. It could also be used to help pilot UVs (unmanned vehicles).

Range information could be used to acquire three dimensional information useful for modelling of objects. Biometric information could be acquired to ensure correct sizing of clothing. A booth provided could be provided with a plurality of cameras and spot projectors to image a whole person, possibly from more than one viewing direction. A person could then stand momentarily within such a booth and be imaged and ranged from a multiplicity of directions. This information could be captured and processed to give create a model of the person which could be used for various design or garment fitting applications. As the cameras would be in fixed relationship to each other there would be no need for any additional positional information to be acquired.

Another useful embodiment is in document scanning. Scanning of documents, such as books, generally requires the page of the book to be pressed as flat as possible against a transparent surface through which the book or document is images. However it is not always practical to image a document in such a manner. Were the document imaged as it just lay open however the curvature of the book would mean that a distorted image would result. Were however the imager combined with a range finding apparatus as described the range to the surface of the book could reveal the curvature thereof. Image processing algorithms could then be used to correct the imaged page for the curvature thereof and present a 'flat' image.

Other applications and embodiments of the invention will be apparent to the skilled person however without departing from the spirit of the invention.

The invention claimed is:

1. A ranging apparatus comprising:
   an illumination means for illuminating a scene with a projected two dimensional array of light spots;
   a detector for detecting the location of each of said spots in the scene; and
   a processor adapted to determine, from the detected location of said spots in the scene, the range to those spots, wherein the illumination means comprises a light source arranged to illuminate only part of the input face of a light guide, the light guide comprising a tube having substantially reflective sides and being arranged together with projection optics so as to project an array of distinct light spots towards the scene.

2. A ranging apparatus as claimed in claim 1 wherein the illumination means and detector are arranged such that each spot in the projected array appears to move in the detected scene, from one range to another, along an axis and the axis of apparent motion of each adjacent spot in the projected array is different.

3. A ranging apparatus as claimed in claim 1 wherein the illumination means is adapted to project an array of spots which is focussed at a first distance and unfocussed at a second distance, the first and second distances being within the operating range of the apparatus.

4. A ranging apparatus as claimed in claim 3 wherein the illumination means is adapted to project an array of spots which are non-circular in shape when focussed.

5. A ranging apparatus as claimed in claim 1 wherein the processor is adapted to resolve any possible ambiguity in range to each spot.

6. A ranging apparatus as claimed in claim 1 wherein the illumination means is adapted to periodically alter the two dimensional array of projected spots.

7. A ranging apparatus as claimed in claim 6 wherein the illumination means is adapted to illuminate the scene cyclically with different arrays of spots.

8. A ranging apparatus as claimed in claim 6 wherein the processor is adapted to determine any areas of ambiguity in the detected array and deactivate one or more of the projected spots so as to resolve the ambiguity.

9. A ranging apparatus as claimed in claim 1 wherein the illumination means is adapted to so as to produce an array of spots wherein at least some projected spots have a different characteristic to adjacent spots.

10. A ranging apparatus as claimed in claim 9 wherein the characteristic is colour.

11. A ranging apparatus as claimed in claim 9 wherein the characteristic is shape.

12. A ranging apparatus as claimed in claim 1 wherein the spots comprise intersections between continuous lines.

13. A ranging apparatus as claimed in claim 12 wherein the illumination means projects two sets of regularly spaced lines, the two sets of lines being substantially orthogonal.

14. A ranging apparatus as claimed in claim 13 wherein the processor is adapted to determine the range to the intersections between the continuous lines and then, using the determined range information determine the range to other points on the continuous lines.

15. A ranging apparatus as claimed in claim 1 wherein the detector comprises a two dimensional CCD or CMOS array.

16. A ranging apparatus as claimed in claim 1 wherein the illumination means is adapted such that the two dimensional array of spots are infrared spots.

17. A ranging apparatus as claimed in claim 16 wherein the detector is adapted to capture a visible image of the scene as well as the location of the infrared spots in the scene.

18. A ranging apparatus as claimed in claim 17 wherein the apparatus includes scanning optics in the optical path to the detector adapted to periodically redirect the viewing direction of the detector.

19. A ranging apparatus as claimed in claim 1 wherein the baseline between the illumination means and the detector is between 50 and 100 mm.

20. A ranging apparatus as claimed in claim 1 wherein the detection system is adapted to image the scene from more than one direction.

21. A ranging apparatus as claimed in claim 20 wherein the detector comprises two detector arrays each detector array arranged so as to image the scene from a different direction.

22. A ranging apparatus as claimed in claim 20 wherein the processor applies image processing algorithms to the scenes from each viewpoint to determine range information therefrom.

23. A ranging apparatus as claimed in claim 20 wherein the detector means is adapted to have a different baseline to the illumination means in each viewpoint.

24. A ranging apparatus as claimed in claim 20 wherein the processor is adapted to determine the possible range to the scene from each viewpoint and compare the possible ranges to resolve any ambiguity.

25. A ranging apparatus as claimed in claim 20 wherein the baseline of at least two of the viewpoints lie along different axes.

26. A ranging apparatus as claimed in claim 25 wherein the light source illuminates the input face of the light guide with a non-circular shape.

27. A ranging apparatus as claimed in claim 1 wherein the apparatus comprises a plurality of detectors, each arranged to image a scene from a different direction.

28. A ranging apparatus as claimed in claim 1 wherein the apparatus further comprises a plurality of illumination means arranged to illuminate the scene from different directions.

29. A ranging apparatus as claimed in claim 28 wherein the apparatus is adapted to periodically change the illumination means used to illuminate the scene.

30. A ranging apparatus as claimed in claim 29 wherein the processor is adapted to determine the possible range to the scene when illuminated with each illumination means and compare the possible ranges to resolve any ambiguity.

31. A ranging apparatus as claimed in claim 28 wherein each illumination means is arranged to have a different baseline to the or each detector or detector array.

32. A ranging apparatus as claimed in claim 28 wherein at least two of the illumination means project spots having different characteristics.

33. A ranging apparatus as claimed in claim 32 wherein the light source illuminates the input face of the light guide with a shape which is non symmetric about the axes of reflection of the light guide.

34. A ranging apparatus as claimed in claim 1 wherein the light guide comprises a tube having a square cross section.

35. A ranging apparatus as claimed in claim 1 wherein the light guide comprises a tube having reflective internal surfaces.

36. A ranging apparatus as claimed in claim 1 wherein the light guide comprises a tube of solid material adapted such that a substantial amount of light incident at an interface between the material of the tube and surrounding material undergoes total internal reflection.

37. A ranging apparatus as claimed in claim 1 wherein the projection optics comprises a projection lens.

38. A ranging apparatus as claimed in claim 1 wherein the light source is arranged to illuminate the input face of the light guide through a mask.

39. A ranging apparatus as claimed in claim 1 wherein the illumination means comprises more than one light source, each light source arranged to illuminate part of the input face of the light guide.

40. A ranging apparatus as claimed in claim 39 wherein the light sources are arranged in a regular pattern.

41. A ranging apparatus as claimed in claim 39 wherein the light sources are arranged to provide differing spot densities.

42. A ranging apparatus as claimed in claim 39 wherein at least one light source emits light at a different wavelength to another light source.

43. A ranging apparatus as claimed in claim 39 wherein at least one light source is shaped differently to another light source.

44. A ranging apparatus as claimed in claim 39 wherein at least one light source has a shape which is not symmetric about a reflection axis of the light guide.

45. A ranging apparatus as claimed in claim 39 wherein at least one light source is located within the light guide at a different depth to another light source.

46. A ranging apparatus as claimed in claim 1 further comprising a means for periodically redirecting the array of spots in the scene.

47. A ranging apparatus as claimed in claim 1 further comprising a location sensor.

48. A proximity sensor incorporating a ranging apparatus as claimed in claim 1.

49. A target identification apparatus incorporating a ranging apparatus as claimed in claim 1.

50. An intruder detection system incorporating a ranging apparatus as claimed in claim 1.

51. A biometric modelling apparatus incorporating a ranging apparatus as claimed in claim 1.

52. A document scanner comprising an imager and a ranging apparatus as claimed in claim 1, wherein the imager is adapted to process the range information from the document to determine the extent of curvature thereof and process the detected image to correct for any curvature.

* * * * *